United States Patent
Naganawa et al.

[19]

[11] Patent Number: 6,134,375
[45] Date of Patent: Oct. 17, 2000

[54] IMAGE SIGNAL RECORDING AND REPRODUCING APPARATUS

[75] Inventors: Kazuo Naganawa, Kakamigahara; Kazuo Ishimoto; Toshihiro Furusawa, both of Gifu, all of Japan; Yoshihito Higashitsutsumi, Sunnyvale, Calif.

[73] Assignee: Sanyo Electric Co., Ltd., Osaka, Japan

[21] Appl. No.: 09/032,219

[22] Filed: Feb. 27, 1998

[30] Foreign Application Priority Data

Mar. 28, 1997 [JP] Japan ................................ 9-078321
Mar. 28, 1997 [JP] Japan ................................ 9-078322
Mar. 28, 1997 [JP] Japan ................................ 9-078323

[51] Int. Cl.[7] .................................................. H04N 11/02
[52] U.S. Cl. .............................. 386/33; 386/36; 386/39; 386/44
[58] Field of Search .................... 386/1, 26, 36, 386/39, 44, 33, 31, 32, 34; 348/642, 663–664, 384, 234–235, 237, 272, 273, 630, 712, 713; H04N 9/79

[56] References Cited

U.S. PATENT DOCUMENTS 5,134,487 7/1992 Tagychi et al. ........................ 348/384
5,287,196 2/1994 Yamashita et al. ..................... 386/36
5,477,336 12/1995 Adachi .................................. 386/36

*Primary Examiner*—Wendy Garber
*Assistant Examiner*—Christopher Onuaku
*Attorney, Agent, or Firm*—Hogan & Hartson, LLP

[57] ABSTRACT

A first digital processor (13) generates luminance data Y and color difference data U, V, using image data D1. The processor (13) further generates separated luminance data Y1, Y2 by halving the luminance data Y, and generates a compound color difference data C by combining the color difference data U, V for output. An JPEG encoder 13 compresses the separated luminance data Y1, Y2 and the compound color difference data C to generate compressed luminance data y1, y2 and compressed color difference data c. A modulator 15 modulates the compressed luminance data y1, y2 and the compressed color difference data c to generate luminance modulated signals m1, m2 and color difference modulated signal mc. A recording/reproducing section 16 records the luminance modulated signals m1, m2 and the color difference modulated signal mc in parallel onto the first to third recording tracks of a magnetic tape (20).

12 Claims, 16 Drawing Sheets

IMAGE SIGNAL RECORDING AND REPRODUCING APPARATUS

BACKGROUND OF THE INVENTION

1. Field of the Invention

The present invention relates to an image signal recording and reproducing apparatus which compresses an image signal for color display and records the compressed image signal in magnetic recording media. The present invention further relates to an image signal recording and reproducing apparatus which can easily record an image signal for color display.

2. Description of the Related Art

In an imaging device, such as a TV camera using a CCD image sensor, horizontal and vertical scanning timings are determined based on various synchronizing signals according to a predetermined television format. As a result of scanning an object at determined timings, image information for one image picture, or one scene, is gathered, and transformed in order to be conveyed by successive image signals arranged in a predetermined order.

FIG. 19 is a block diagram representing a basic structure of an imaging device using a CCD image sensor; FIG. 20 is a diagram indicating operation timings of the device of FIG. 19.

A CCD image sensor 1 of a frame transferring type comprises an imaging device 1$i$, a storage 1$s$, a horizontal slider 1$h$, and an output section 1$d$. An imaging device 1$i$ consists of a plurality of CCD shift registers which are arranged parallel to each other and successive in the vertical direction. Each bit of the respective shift registers constitutes a light receiving pixel element for storing information charges generated while taking images.

Storage 1$s$, comprising a plurality of CCD shift registers having as many bits as those of the sensor 1, is continuous with the shift registers of the imaging device 1$i$. Each bit of the respective shift registers temporarily stores the image charges supplied from each light receiving pixel element of the imaging device 1$i$.

The horizontal slider 1$h$, comprising a single CCD shift register each bit of which is coupled to an output of each shift register of the storage 1$s$, sequentially shifts the information charges supplied for every horizontal line from the storage 1$s$, toward the output section 1$d$.

The output section 1$d$ is located on the output side of the horizontal slider 1$h$, and has a capacity for receiving information charges slid toward the output section 1$d$. The section 1$d$ generates a voltage whose value varies depending on the amount of supplied information charges. The variation serves as an image signal 10.

A driver circuit 2 comprises a frame clock generator 2$f$, a vertical clock generator 2$v$, a horizontal clock generator 2$h$, and a reset clock generator 2$r$. The frame clock generator 2$f$ generates a frame clock $\phi$f in response to a frame shift timing signal FT, and supplies the clock $\phi$f to the imaging device 1$i$ so that information charges stored in the respective light receiving pixel element of the imaging device 1$i$ are transferred to the storage 1$s$ at high speed each vertical scanning period.

The vertical clock generator 2$c$ generates a vertical clock $\phi$v in response to a vertical synchronizing signal VT and a horizontal synchronizing signal HT, and supplies the signal $\phi$v to the storage 1s so that the storage 1$s$ tentatively stores the image charges supplied from the imaging device 1$i$, and forwards the charges further to the horizontal slider 1$h$ for every horizontal scanning line in every horizontal scanning period.

The horizontal clock generator 2$h$ generates a horizontal transfer clock $\phi$h in response to a horizontal synchronizing signal HT, and supplies the signal $\phi$h to the horizontal slider 1$h$ so that the slider 1$h$ sequentially slides the information charges supplied from the storage 1$s$ for every horizontal line toward the output section 1$d$.

A reset clock generator 2$r$ generates a reset clock $\phi$r, and supplies the clock $\phi$r to the output section 1$d$ so that the information charges slid by the horizontal slider 1$h$ toward the output section 1$d$ for every pixel, are stored in the output section 1$d$ and then outputted in synchronism with the operation of the horizontal clock generator 2$h$.

A timing control circuit 3, which operates based on a reference clock having a constant cycle, generates a vertical synchronizing signal VT and a horizontal synchronizing signal HT for determining the timings at which the image sensor 1 executes vertical and horizontal scanning, and supplies the signals to the driver 2. The circuit 3 also generates a frame shift timing signal FT having the same cycle as that of a vertical synchronizing signal VT, and supplies the signal FT to the driver circuit 2. The timing control circuit 3 is responsible for a shutter control so as to keep the image sensor 1 in the optimum exposure state. Specifically, the circuit 3 instructs the imaging device 1$i$ to output, during a vertical scanning operation, information charges stored therein, according to the amount of information charges caused and stored thus far in the imaging device 1$i$. That is, when the circuit 3 sets a faster shutter operation timing for outputting information charges from the imaging device 1$i$, information charges stay in the imaging device 1$r$ in a longer period of time. On the other hand, when the circuit 3 sets a slower shutter timing, information charges stay in the imaging device 1$r$ in a shorter period of time before an image taking operation is conducted with respect to the next picture frame before long. Note that a shutter operation is executed according to a driver clock supplied to the image sensor 1 by the driver circuit 2 to the image sensor 1.

An image signal I0 obtained through the above processes is supplied to a conventional television monitor or a recording device to be used for repeatedly displaying object images in the unit of an image picture at a frame rate determined corresponding to a vertical synchronizing signal VT.

It has also been attempted to input an image signal obtained by an imaging device into a personal computer or the like, as digital imaging device, to be used for displaying an image on the monitor screen thereof. An image obtained by an imaging device is seldom displayed on a full screen. Rather, it is generally compressed to be display a small image on the screen. As an image format adaptable to such a displaying manner, Common Intermediate Format (CIF) (352×240 pixels) and Quarter CIF (QCIF) standards (176× 120 pixels) are available. CIF defines a size about a quarter of that of the Video Graphic Array (VGA) standard (640× 480 pixels), which is one of the major personal computer monitor standards; QCIF define a size about a quarter that of the CIF standards. These standards are becoming widely accepted.

In an imaging device employing CIF or QCIF, the number of pixels according to the respective standards are installed into the image sensor. With these devices, the cost of an imaging unit is smaller than for conventional imaging devices adopted to general television formats, such as NTSC or PAL.

However, a recording format dedicated to imaging devices, such as the VHS format available for NTSC, has yet to be proposed for CIF or QCIF. Therefore, it has long been desired to determine a format in which image signals are recorded so as to be adopted to the above devices.

Conventionally, a digitally converted image signal is inputted into a computer device in a predetermined format, and stored in a recording means incorporated into or connected to the computer device. However, the imaging device must remain continuously connected to the computer in this method in order to introduce an image signal from the device to a computer. This is quite inconvenient.

SUMMARY OF THE INVENTION

The present invention has been conceived to overcome the above problems and aims to provide an image recording and reproducing apparatus capable of easy recording of image signals for displaying a smaller image picture consisting of a fewer number of pixels, using a magnetic tape.

In a first aspect of the present invention, there is provided (claim 1).

In this aspect, two types of luminance modulated signals stemming on a luminance signal, and one color difference modulated signal made by combining two types of color difference signals, are recorded in parallel in the first to third recording tracks of a recording medium. A luminance signal having a large information amount is halved so as to each have a lower frequency. Color difference signals each having a small information amount are combined together to be recorded in one recording track.

With this arrangement, it is possible to record an image signal for color images in an audio cassette tape which generally has four recording tracks.

According to a second aspect of the invention, there is provided (claim 3).

In this aspect, two types of luminance modulated signals read from a recording medium is combined into one luminance signal, while a color difference modulated signal is halved into two types of color difference signals.

According to a third aspect of the invention, there is provided (claim 5).

In this aspect, two types of luminance modulated signals stemming on a luminance signal, and one color difference modulated signal made by combining two types of color difference signals, are recorded in parallel, together with an audio signal including a timing clock signal, in the first to fourth recording tracks of a recording medium. A luminance signal having a large of amount information is halved, so as to each have a lower frequency. Color difference signals each having a small information amount are combined together to be recorded on one recording track. Also, an audio signal including fewer high frequency components is superimposed by a timing clock signal in a high frequency band matching the modulation cycle of the luminance modulated signals and the color difference modulated signal, to be recorded in one recording track.

With this arrangement, it is possible to record an image signal for color image on an audio cassette tape with four recording tracks. At the same time, the luminance modulated signals and the color difference modulated signals can be properly demodulated based on the timing clock signal superimposed on the audio signal, despite unstable traveling speed of a cassette tape.

According to a fourth aspect of the invention, there is provided (claim 7).

In this aspect, two types of luminance modulated signals read from a recording medium are combined into a luminance signal, while a color difference modulated signal is halved into two types of color difference signals.

According to a fifth aspect of the invention, there is provided (claim 9).

In this aspect, a color component which is influential in resolution is halved into first and second separated color component signals each with a lower frequency so that the signal can be recorded in a recording medium while maintaining the same information amount. Information amounts of other color components are reduced before those components are combined into a compound color component signal to be recorded in a recording medium.

With this arrangement, image information can be recorded without deterioration of resolution on a recording medium which has limited capability of recording an image signal in a high frequency hand by using an image signal which has been processed to have a lower frequency.

According to sixth aspect of the invention, there is provided (claim 11).

In this aspect, an image signal is broken up into a plurality of color components so as to be recorded for every color component. Further, a clock signal having a constant frequency is superimposed onto an audio signal, and recorded, together with a number or color components, in a recording medium.

With this arrangement, a clock signal for synchronizing reproduction timings for the respective color component signals can be also recorded in a recording medium.

BRIEF DESCRIPTION OF THE DRAWINGS

The above and other objects, features, and advantages of the present invention will become further apparent from the following description of the preferred embodiments taken in conjunction with the accompanying drawings wherein.

DESCRIPTION OF THE PREFERRED EMBODIMENTS

Embodiment 1

Figure 1:
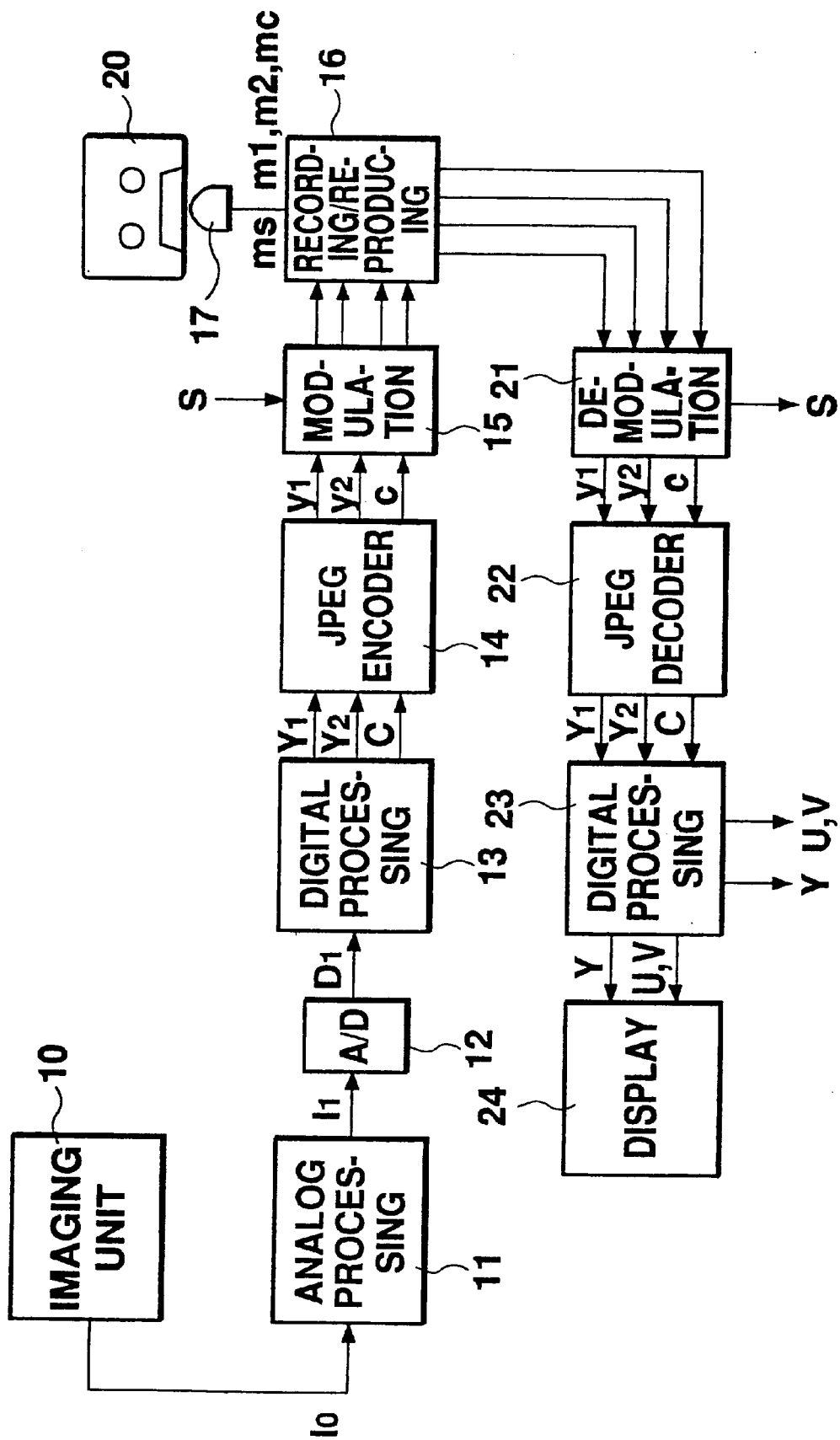
FIG. 1 is a block diagram representing a structure of an image signal recording and reproducing apparatus according to a first preferred embodiment of the present invention.

FIG. 1 is a block diagram representing a structure of an image signal recording and reproducing apparatus of a first preferred embodiment of the present invention.

Figure 19:
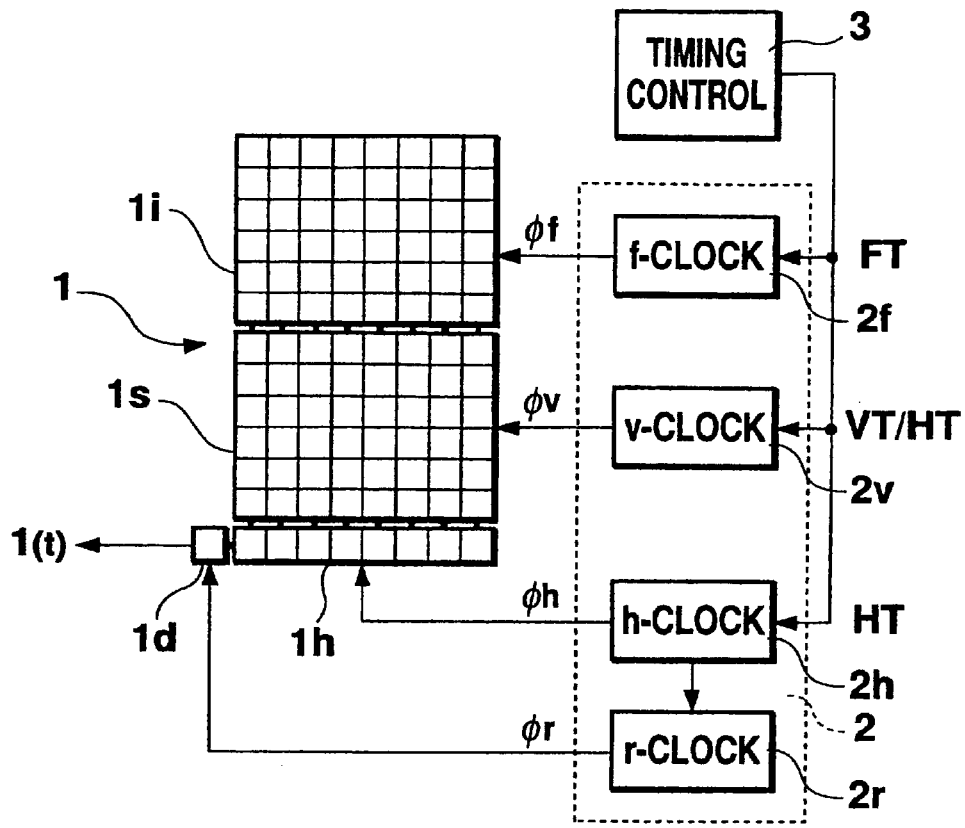
FIG. 19 is a block diagram showing a structure of a conventional imaging device.
Figure 20:
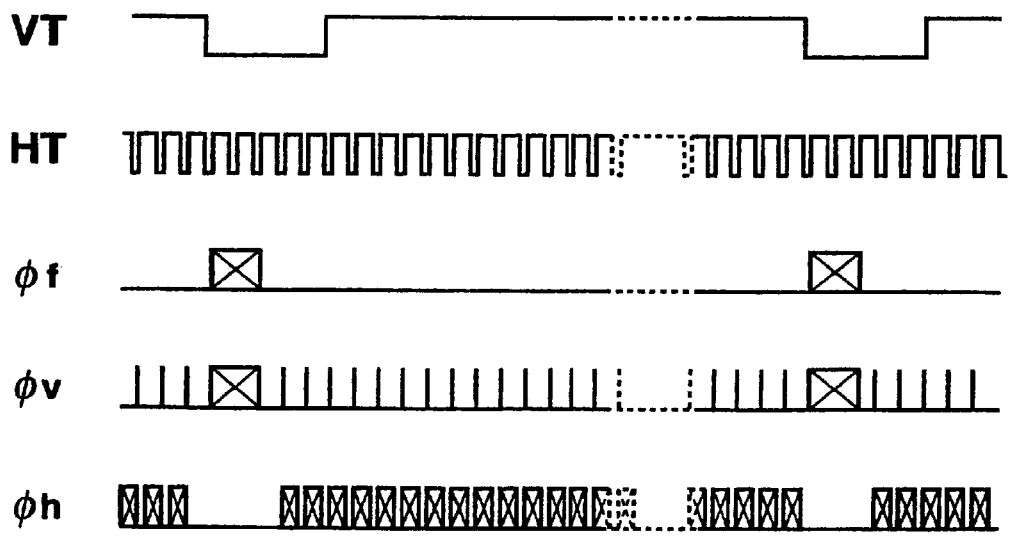
FIG. 20 is a diagram explaining an operation timing of a conventional imaging device.

An image taking unit 10 has the identical structure to that of a conventional imaging device as shown in FIG. 19, comprising a timing controller, a driver, and an image sensor. The image sensor according to, for instance, QCIF has 176×120 (horizontal×vertical) pixels, and outputs an image signal I0 for an image picture consisting of 120 horizontal lines, each including 176 pixels. The image sensor of the image taking unit 10 carries a mosaic color filter so that light receiving pixel elements of the image sensor are allocated to correspond to color components relative to the color filter. The mosaic color filter may comprise, for instance, white (W) segments and green (G) segments alternately arranged in each odd line, and cyan (Cy) segments and yellow (Ye) segments in each even line. Therefore, an image signal of an object image taken through the color filter contains color components corresponding to each segment of the color filter.

An analog processor 11, which operates in synchronism with the output operation of the image taking unit 10, performs analog signal processing, including sampling, holding, gamma correction, and outputs an image signal I1 according to a predetermined format. For instance, in a sampling and holding operation, an image signal I0 wherein voltage repeatedly rises/falls to a reset level and to a signal level in synchronism with the output operation of the image sensor, is processed so that voltages at a signal level are solely extracted. Further, in a gamma correction operation, the extracted voltage at a signal level is rendered to non-linear conversion for correction of the difference between the actual luminance of a reproduced image picture and the luminance thereof perceived by human sight.

An A/D converter 12, which also operates in synchronism with the output operation of the image taking unit 10, generates image data D1 by converting analog image signals I1 supplied from the analog processor 11 to digital data. The resultant digital image data D1 each being originated from each light receiving pixel element of the image sensor, indicate the amount of information charges stored in the respective originated light receiving pixel elements.

A first digital processor 13 executes a predetermined operation to image data D1 supplied from the A/D converter 12 to thereby generate red color data R, blue color data B, and luminance data Y, the luminance data being a mixture of respective color data at a predetermined ratio. In generation of luminance data Y, color components of the three primary colors are combined so as to be contained at a predetermined ratio, such as red:green:blue as 1:2:1, in every data Y on respective light receiving pixel elements.

Figure 2:
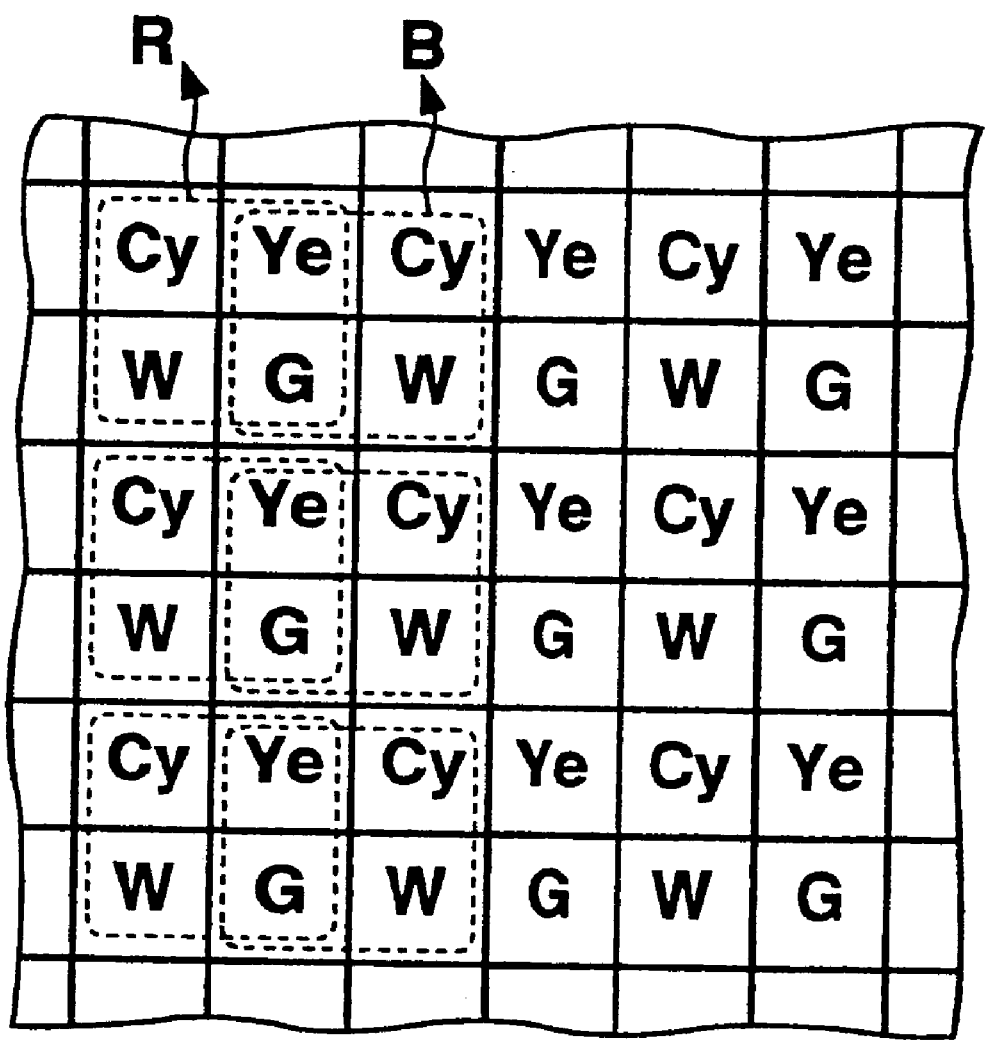
FIG. 2 is a plan view showing an example structure of a mosaic color filter.

In generation of color data R and B, image data is processed by a conventional color operation every fourth pixel element. For instance, when image data D1 contains color components of yellow (Ye), cyan (Cy), green (G), and white (W) corresponding to the color filter shown in FIG. 2, color data (R) is generated by subtracting (G+Cy) from (W+Ye); color data (G) is generated by subtracting (G+Ye) from (W+Cy). As a result, an amount of luminance data Y equal to the number of light receiving pixel elements installed to the image sensor are generated, along with a quarter as many color data R and B. Further, subtracting luminance data value Y from respective color data R and B results in generating color difference data U and V. In this subtraction, every fourth luminance data Y is extracted because the number of data R and B each is a quarter of that of luminance data Y. Alternatively, the average of four luminance data Y is subtracted from the data R and B.

Further, in the first digital processor 13, luminance data Y is once stored in a buffer before being separated into two groups each including separated luminance data in units according to the unit for a compression operation by the JPEG encoder 14 (8 lines×8 columns) (described later). The processor 13 then outputs the two groups of separated luminance data in parallel as a pair of separated luminance data Y1 and Y2. The processor 13 also stores color difference data U and V once in a buffer, and later alternately outputs them as compound color difference data C in accordance with a processing unit for a compression operation by the JPEG encoder 14.

Note that, since the amount of color difference data U, V each are both a quarter of that of luminance data Y, separated luminance data Y1, Y2 and compound color difference data C are resultantly outputlly at the same rate. Also, in the processor 13, one image picture (an image for one screen) is divided into a plurality of blocks each consisting of 8 lines×8 columns pixels, and respective data is outputted by the unit of a block. With this arrangement, outputted data can be adopted to a compression operation by the JPEG encoder 14.

The JPEG encoder 14 performs a compression operation according to Join Photographic Expert Group (JPEG) with respect to separated luminance data Y1, Y2 and compound color difference signals C supplied in blocks from the first digital processor 13. The compression operation is conducted individually for these data, either via three circuits in parallel or via one circuit operating in a time division method. As a result of this operation, the separated luminance data Y1, Y2, and compound color difference data C are respectively transformed into compressed luminance data y1, y2, and compressed color difference data C.

A modulator 15 gives analog modulation to compressed luminance data y1, y2 and compressed color difference data c output from the JPEG encoder 14, and supplies resultant signals capable of being recorded in magnetic recording media, namely luminance modulated signal m1, m2, and color difference modulated signal mc, to a recording/reproducing section 16. The modulator 15 also gives analog modulation to sound data S which corresponds to an audio signal generated during an image taking operation by the image taking unit 10, and supplies the resultant signal, or a sound modulated signal mS, to the recording/reproducing section 16.

Sound data is obtained via a microphone (not shown) or the like, which is generally provided together with the image taking unit 10. As the sound data S has a smaller amount of information compared to luminance data Y or other data, it may be supplied intact to analog modulation without being compressed. Also, sound data S may be supplied in the form of an analog data to the recording and recording section 16, without being converted into digital data.

Figure 3:
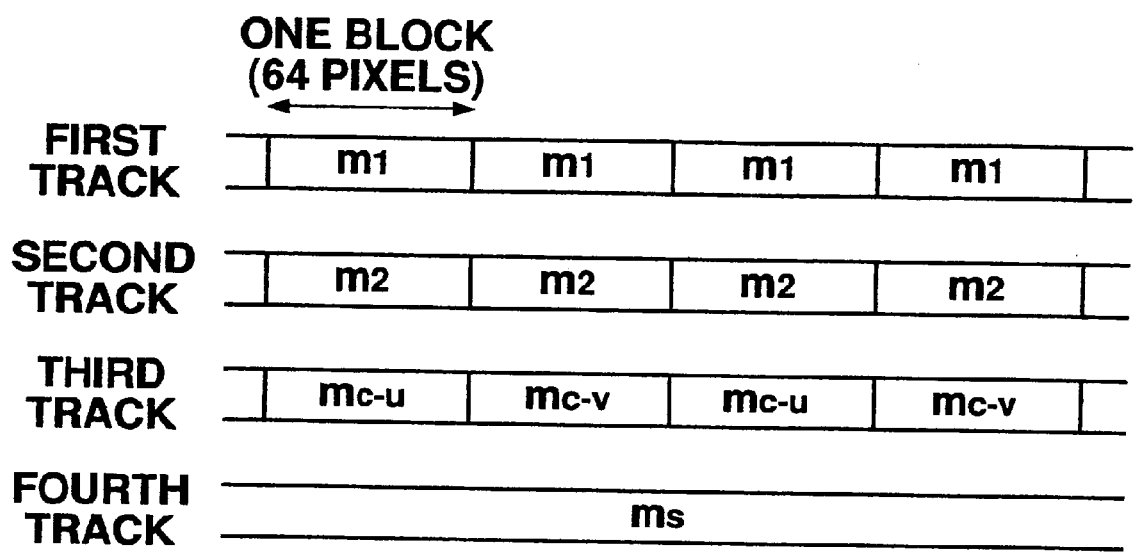
FIG. 3 is a diagram illustrating recording status of recording tracks of a magnetic tape.

The recording/reproducing section 16 receives luminance modulated signals m1, m2, color difference modulated signal mc, and sound modulated signal mS from the modulator 15, and writes them into four recording tracks of a magnetic tape 20 by using a magnetic head 17 connected thereto. For instance, as shown in FIG. 3, luminance modulated signals m1, m2 are recorded in the first and second recording tracks for every block (64 pixels), while color difference modulated signal mc is recorded in the third recording track. Note that, in this recording, a color difference modulated signal mc corresponding to the first color difference data U, namely signal mc-U, and that corresponding to the second color difference data V, namely a signal Mc-V, are recorded alternately for every block. Finally, a sound modulated signal mS is continuously recorded in the fourth recording track.

While recording these modulated signals m1, m2, mc, mS, the recording/reproducing section 16 also reads recorded modulated signals m1, m2, mc, mS from a magnetic tape 20, as the section 16 is constructed so as to read these signals recorded in the magnetic tape 20 by using the magnetic heat 17, and supply them to a de-modulator 21 in the image reproduction mode. That is, the section 16 performs either a writing or reading operation using modulated signals m1, m2, mc, mS with respect to the magnetic tape 20 according to an operation mode desirably switched.

The de-modulator 21 gives a decoding operation with respect to reproduced signals input in four separate lines from the section 16 to thereby restore digital data of compressed luminance data y1, y2, compressed color difference data c, and sound data S. Compressed luminance data y1, y2 and compressed color difference data c are then supplied to a JPEG decoder 22 (described later), while sound data S is supplied to an audio reproduction system (not shown) including a D/A converter, an amplifier, and so on.

A JPEG decoder 22, which operates inversely to the JPEG encoder 14, gives a decoding operation to compressed luminance data y1, y2 and compressed color difference data c supplied from the de-modulator 21 to thereby restore separated luminance data Y1, Y2 and compound color difference data C. The restored data are for the most part identical to those generated by the digital processor 13, depending on the compression rate set with the JPEG encoder 14. Similar to the JPEG encoder 14, compressed luminance data y1, y2, and compressed color difference data c are individually processed by three separate, parallel circuits or one circuit operating according to a time division method.

A second digital processor 23 stores in a buffer, separated luminance data Y1, Y2 supplied in blocks by the JPEG decoder, and combines the data Y1 and Y2 into luminance data Y in one successive line. The processor 23 also divides compound color difference data C in blocks into color difference data U and V each in successive lines. The processor 23 supplies the resultant luminance data Y and the color difference data U, V to a computer device according to a predetermined format, as well as to a display 24. With the above, an image read from the magnetic tape 20 can be displayed on a monitor.

In supplying image information to a computer device, 411 format and 422 format are available. In 411 format, luminance information and two color difference information are combined at the ratio 4:1:1; in 422 format, at 4:2:2.

Figure 4:
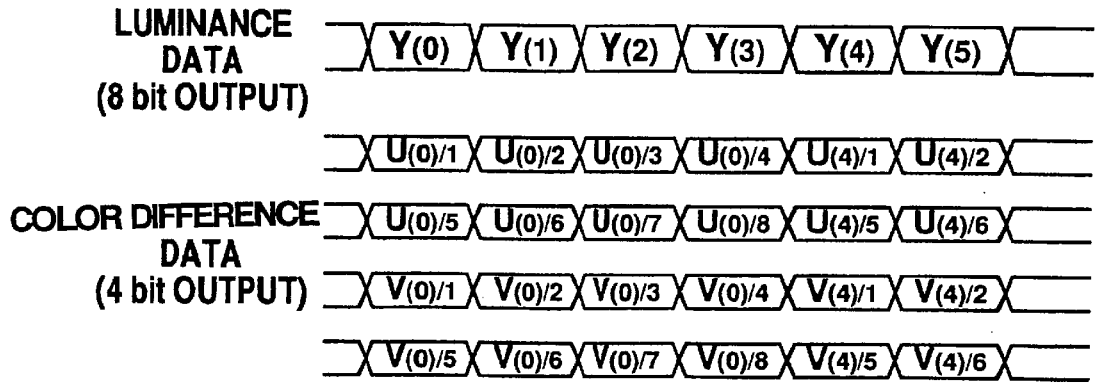
FIG. 4 is a diagram illustrating a format for outputting image information to a computer.
Figure 4:
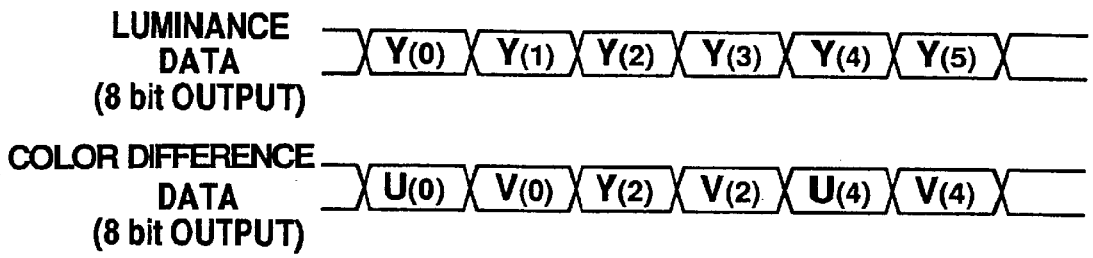

With 411 format, as shown in FIG. 4, luminance data Y of 8 bits is forwarded for every 8 bits, or one pixel, in one forwarding cycle, while color difference data U, V each of 8 bits is forwarded for every two bits in one forwarding cycle. That is, while one luminance data y (8 bits) is forwarded in one forwarding cycle, a pair of color difference data U, V are forwarded in four cycles, i.e., 2×2 bits in one cycle.

With this forwarding operation, one pair of color difference data values U, V and four luminance data point Y are forwarded using a transmission line of 12 bits.

Note that the luminance data Y and color difference data U, V generated by the second digital processor 23 can be supplied intact to a computer device according to 411 format, as the data contains luminance information and two color difference information in the 4:1:1 ratio.

With 422 format, as shown in FIG. 4, luminance data of 8 bits for one pixel is forwarded for every pixel in one forwarding cycle, while two types of color difference data U, V, each of 8 bits for one pixel, are alternately forwarded for every one pixel. In 422 format in which luminance data Y and two types of color difference data U and V are required to be combined at the ratio 4:2:2, the number of color difference data U, V must be doubled through interpolation between adjacent pixels using their average value.

Data transmission rates at respective sections under QCIF Standards will next be explained.

An image picture according to QCIF Standards must consist of 176×120 (horizontal×vertical) pixels. Providing that image data D1 represents one pixel by using eight bits, the total data amount for one image picture is $$176 \times 120 \times 8 = 168.96 \text{ Kb.}$$

Given a frame rate of $\frac{1}{15}$ second, the image data D1 is input into the first digital processor 13 at a transmission rate of $$168.96 \text{K} \times 15 = 2534.4 \text{ Kbps.}$$

Since the amount of luminance data Y equals that of image data D1, while color difference data U, V each have a quarter the amount of data of the luminance data Y, the amount of data being outputted from the first digital processor 13 will be 1.5 times as large as that which has being inputted thereto. This data with an increased amount is output via three transmission paths to the JPEG encoder 14 at a transmission rate of $$2534.4 \text{K} \times 1.5/3 = 1267.2 \text{ Kbps.}$$

Providing that a compression rate of the JPEG encoder is $\frac{1}{30}$, the above data is input into the modulator 15 at a transmission rate of $$1267.2 \text{K}/30 = 42.24 \text{ Kbps.}$$

When speaking of an analog signal which is capable of expressing two digital data in one cycle, 2 bps substantially corresponds to 1 Hz. Therefore, respective modulated signals m1, m2, mc to be inputted into the recording/reproducing section 16 each have a frequency of $$42.24 \text{K}/2 = 21.12 \text{ Khz.}$$

A common audio cassette tape is generally usable with a frequency band up to around 20 KHz, is able to record respective modulated signal m1, m2, mc because although the above frequency was calculated under the assumption that 176×120 pixels are all effective, most of the time in actuality, not all pixels are used as some peripheral pixels are located out of the effective image region. Therefore, the amount of data for one image picture turns out to be less than that on which the above calculated is based, and the frequency of respective modulated signals m1, m2, mc resultantly drop under 20 KHz, even if the frame rate of the image taking unit 10 is equal to the compression rate of the JPEG encoder 14.

Figure 5:
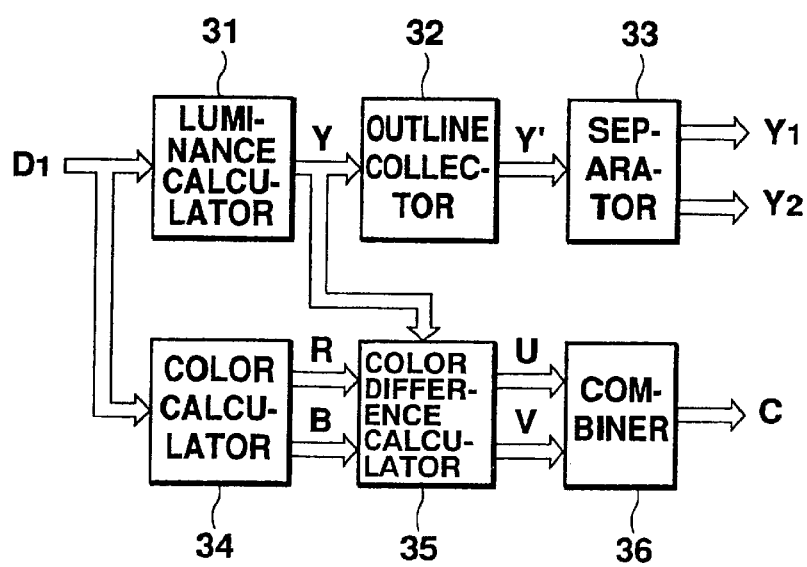
FIG. 5 is a block diagram representing a structure of a first digital processor.

FIG. 5 is a block diagram representing an example structure of the first digital processor 13.

The first digital processor 13 comprises a luminance calculator 31, an outline corrector 32, a separator 33, a color calculator 34, a color difference calculator 35, and a combiner 36.

Figure 6:
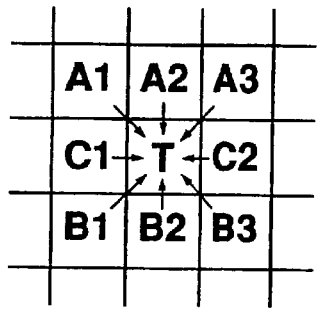
FIG. 6 is a diagram expressing positional relationship between a target pixel and adjacent pixels.

The luminance calculator 31 adds image data D1 of the pixels surrounding a target pixel to image data D1 of the target pixel at a predetermined ratio, to thereby generate luminance data Y containing color components of three primary colors (R, G, B) at 1:2:1. For instance, as shown in FIG. 6, the image data D1 of the target pixel T is combined by respective halves of image data D1 of the four adjacent pixels, i.e., on the upper, lower, left, and right sides, (A2, B2, C1, C2), and quarters of image data D1 of four diagonally adjacent four pixels (A1, A3, B1, B3) to thereby generate luminance data Y. By making the above calculation corresponding the color filter shown in FIG. 2, a relationship of $$W+G+Ye+Cy=2R+4G+2B=Y$$

is obtained for all pixel elements, so that luminance data Y containing color components of red, green, and blue at 1:2:1 is obtained.

The outline corrector 32 generates luminance data Y' with enhanced contrast by adding to the luminance data Y of the target pixel, the difference in luminance data Y of between the target pixel and the adjacent pixels. For example, as shown in FIG. 6, a value obtained by averaging the differences in luminance data Y between the target data Y and the respective upper, lower, right, and left pixels (A2, B2, C1, C2), and then amplifying by a predetermined factor, is added to the luminance data Y of the target pixel T.

The separator 33 rearranges the luminance data Y' supplied by the raster unit, or in successive lines, into successive blocks each of 8×8 pixels, which are then alternately extracted to be arranged in two groups, i.e., first and second luminance data Y1 and Y2, and output.

The above rearrangement, i.e., raster/block conversion, is done because luminance data Y' supplied from the outline corrector 32 in successive lines corresponding to horizontal scanning by the image sensor, must be rearranged to be in successive blocks each of 8 lines×8 columns to be applicable to the compression operation by the JPEG encoder 14. Further, in order to avoid loss accompanying a lowering of transmission rate, the luminance data Y' in successive blocks are divided into two successive lines of blocks, one including odd-numbered blocks, or first separated luminance data Y1, and the other even-numbered blocks, or second separated luminance data Y2, so that they can be output via two transmission lines.

The color calculator 34 takes image data D1 for every four pixels such that each data D1 contains different color components, and conducts a predetermined color calculation to thereby generate color data R corresponding to red color components and color data B corresponding to blue color components. For instance, when using a color filter shown in FIG. 2, in which four mutually adjacent pixels respectively correspond to colors W, G, Ye, Cy, color data R and B will be generated in the following calculation. That is, the color data R is generated by subtracting the sum of image data D1 of colors G and Cy, i.e., (G+Cy), from the sum of image data D1 of colors W and Ye, i.e., (W+Ye); the color data B is generated by subtracting the sum of image data D1 of colors G and Ye, i.e., (G+Ye), from the sum of image data D1 of colors W and Cy, i.e., (W+Cy).

The color difference calculator 35 generates color difference data U, V by subtracting luminance data Y supplied from the luminance calculator 31 from color data R and B supplied from the color calculator 34. Note that the color calculator 35 takes either luminance data Y for every fourth data, or the average of the four luminance data Y in the above subtraction operation, as the numbers of color data R, B each are a quarter of that of luminance data Y.

The combiner 36 rearranges the color difference data U, V supplied by the raster unit, or in successive lines, into being arranged in successive blocks each of 8 lines×8 columns. The combiner 36 further extracts color difference data U in blocks and color difference data V in blocks, and alternately combines them thereby generating a compound color difference data C to output.

The rearrangement i.e., raster/block conversion, is dones because color difference data U, V supplied by the color calculator 35 in successive lines corresponding to horizontal scanning by the image sensor, must be rearranged to be in successive blocks each of 8 lines×8 columns so that compression by the JPEG encoder can be applied. Further, the combiner 36 alternately outputs color difference data U as odd-numbered blocks and color difference data V as even-numbered blocks at a transmission rate matching that of the separated luminance data Y1, Y2.

Note that the first digital processor 13 is connected to a RAM which is commonly accessible from the respective circuits 31 to 36, the RAM being capable of storing data for an appropriate number of lines to be needed in the respective circuits 31 to 36.

Figure 7:
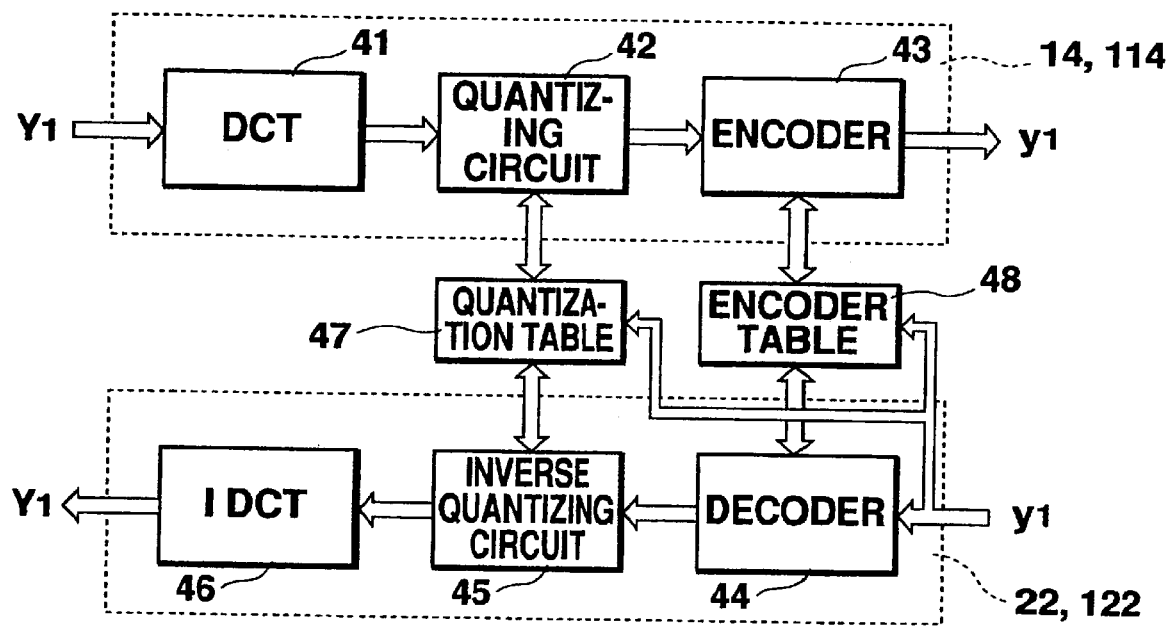
FIG. 7 is a block diagram representing structures of an JPEG encoder and a JPEG decoder.

FIG. 7 is a block diagram representing structures of the JPEG encoder and the JPEG decoder 22 for processing separated luminance data Y1. A JPEG encoder and a JPEG decoder having identical structures will be also used for separated luminance data Y2 and compound color difference data C.

Figure 8:
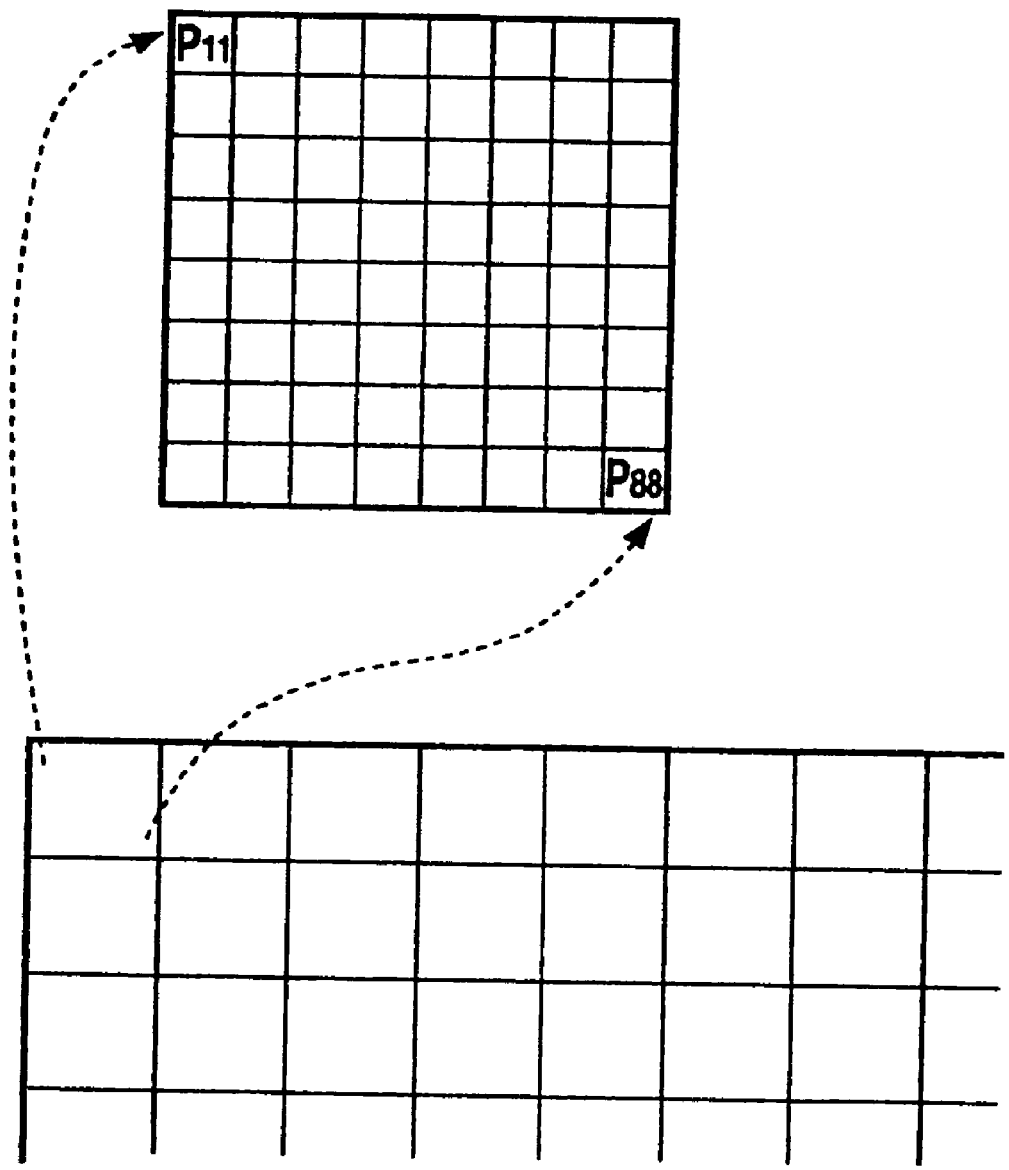
FIG. 8 is a diagram showing a block structure of a screen to be processed according to a JPEG algorithm.

In an encoding format according to JPEG algorithm, one image picture is divided into a plurality of blocks each consisting of 8×8 pixels, as shown in FIG. 8, and an encoding operation is conducted for every block. That is, 64 data P11 to P88, constituting one block of 8 lines×8 columns, is used as one unit for an encoding operation so that the amount of data is reduced.

The JPEG encoder 13 comprises a DCT circuit 41, a quantizing circuit 42, and an encoder 43, while the JPEG decoder 22 comprises a decoder 44, an inverse quantizing circuit 45, and an IDCT circuit 46. The JPEG encoder 13 and the JPEG decoder 22 are connected to a quantization table storing threshold values for quantizing/inverse quantizing operations, and to an encoder table 48 storing Huffuman codes for encoding/decoding operations.

The DCT circuit 41 takes in separated luminance data Y1 for one block (8 lines×8 columns=64 pixels), and performs second order discretion cosine transform (DCT) with respect to the taken image data Y1 to thereby generate 64 DCT factors.

The quantizing circuit 42 quantizes the DCT factors supplied by the DCT circuit 41 while referring to threshold values stored in the quantization table 47. The threshold, which is defined according to the purpose of the device, is used in a quantizing operation to determine the compression rate for image data and the image quality of reproduced images. The encoder 43 performs a variable length encoding operation to a quantized DCT factor, based on the Huffuman code stored in the encoding table 48, to thereby generate compressed luminance data y1. The Huffuman codes are codes having a variable length, and assigned beforehand to quantized DCT factors according to the expected frequency in being used. As a frequently used quantized DCT factor is given a short Huffuman code, using an JPEG encoder enables compression of the data amount to about 1/40.

Inversely from the encoder 43, the decoder 44 takes compressed luminance data y1 for one block (8 lines×8 columns=64 pixels), and performs a variable length decoding operation to compressed image luminance data, based on the Huffuman code stored in the encoding table 48. Note that a factor obtained through a variable length decoding operation corresponds to a quantized DCT factor obtained by the JPEEG encoder 13. Inversely from the quantizing circuit 42, the inverse quantizing circuit 45 performs an inverse quantizing operation with respect to a factor supplied by the decoder 44, referring to a threshold value stored in the quantization table 47, to thereby restore a DCT factor. Then, the IDCT circuit 46 performs inverse discrete cosine transform (IDCT) with respect to a DCT factor supplied by the inverse quantizing circuit 45 to thereby restore separated luminance data Y1. In the IDCT circuit 46, data for one block is simultaneously converted before being sequentially outputted for every pixel in a predetermined order.

In the above, an image signal according to QCIF Standards have been described. It is, however, not limited to QCIF Standards, and any standards defining the size up to that of CIF Standards may be applicable in recording image signals in magnetic recording media, such as an audio cassette tape. Also, data compression algorithms other than JPEG, such as MPEG or H.263, may be used instead.

As described above, according to this embodiment of the invention, it is possible to record and reproduce an image signal for color images on a simple structure using an audio cassette tape. Thus, there can be provided a low cost imaging device, with able to record and reproduce an image signal for displaying a picture small enough to be used with a computer device.

Embodiment 2

Figure 9:
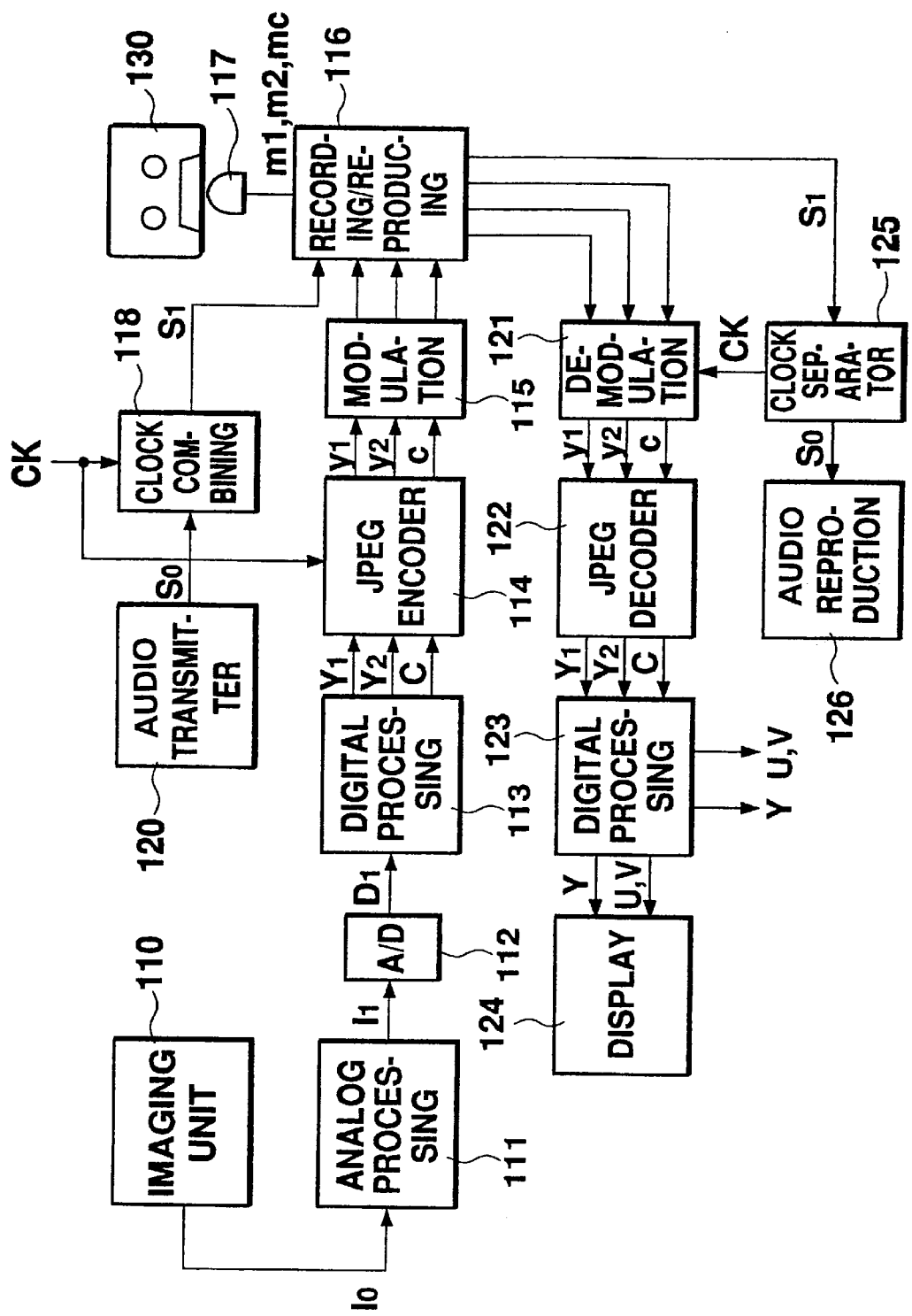
FIG. 9 is a block diagram representing a structure of an image signal recording and reproducing apparatus according to a second preferred embodiment of the present invention.

FIG. 9 is a block diagram representing a structure of an image signal recording/reproducing apparatus according to the second preferred embodiment of the present invention.

An image taking unit 110 has the identical structure to that of a conventional image taking unit as shown in FIG. 19, comprising a timing controller, a driver, and an image sensor. The image sensor which accords to, for instance, QCIF, has 176×120 (horizontal×vertical) pixels attached thereto, and outputs an image signal I0 for an image picture consisting of 120 horizontal lines, each including 176 pixels. The image sensor of the image taking unit 110 carries a mosaic color filter so that light receiving pixel elements attached to the image sensor are allocated to correspond to color components relative to the color filter. The mosaic color filter may comprise, for example, white (W) segments and green (G) segments alternately arranged in each odd line, and cyan (Cy) segments and yellow (Ye) segments in each even line. Therefore, a resulting image signal contains color components corresponding to each segment of the color filter.

The operations of analog processor 111, A/D converter 112, first digital processor 113, JPEG encoder 114 are the same as described in the first preferred embodiment and therefore will not be described again here.

A modulator 115 operates in the same manner as described in the first embodiment. That is, it gives analog modulation to compressed luminance data y1, y2 and compressed color difference data c outputted from the JPEG encoder 114, and supplies resultant signals capable of being recorded in magnetic recording media, namely luminance modulated signal m1, m2, and color difference modulated signal mc, to a recording/reproducing section 116.

In this modulator 115, arrangement of "1" and "0" in digital data is transformed through analog modulation to be expressed by means of amplitudes of an analog signal, wherein one cycle of each modulated signal represents data for two bits.

A sound transmitter 120, including a microphone and an amplifier, records sound occurring when taking object images, and outputs this sound as an audio signal S. The sound transmitter 120 is generally provided together with the image taking unit 110.

Figure 10A:
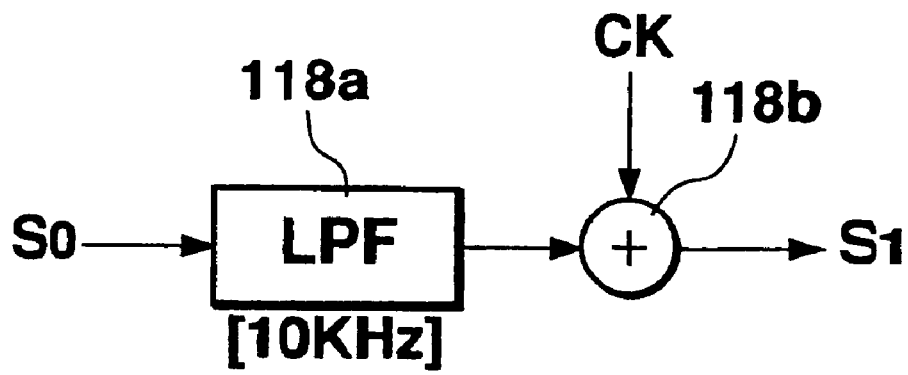
FIG. 10A is a block diagram representing structures of clock combiner.

A clock combiner 118 comprises a low pass filter 118a and an adder 118b, as shown in FIG. 10(a). The combiner 118 obtains, through the low pass filter 118a, the audio signal S0 input from the sound transmitter 120, and superimposes a common reference clock CK onto the audio signal S0 using the adder 118b to thereby generate a composite audio signal S1 to output. Note that a reference clock CK is synchronized with the timing at which imaging at which compressed luminance data y1, y2, and compressed color difference data are output from the JPEG encoder 114, and also the timing at which luminance modulated signals m1, m2, and color difference modulated signal mc are output from the recording and reproducing section 116.

When the low pass filter 118a is set to have a 10 KHz cut-off frequency, a listener can hear the sounds reproduced from signals having passed through the filter without loss of quality because the human ear can usually not discern frequency components above 10 KHz. While the cut-off frequency for the low pass filter is thus set at 10 KHz, a reference clock CK has a frequency of about 20 KHz, similar to luminance modulated signals m1, m2, and color difference modulated signal mc (described later). Therefore, frequency bands of an audio signal S0 and of a reference clock CK can be separated.

Figure 12:
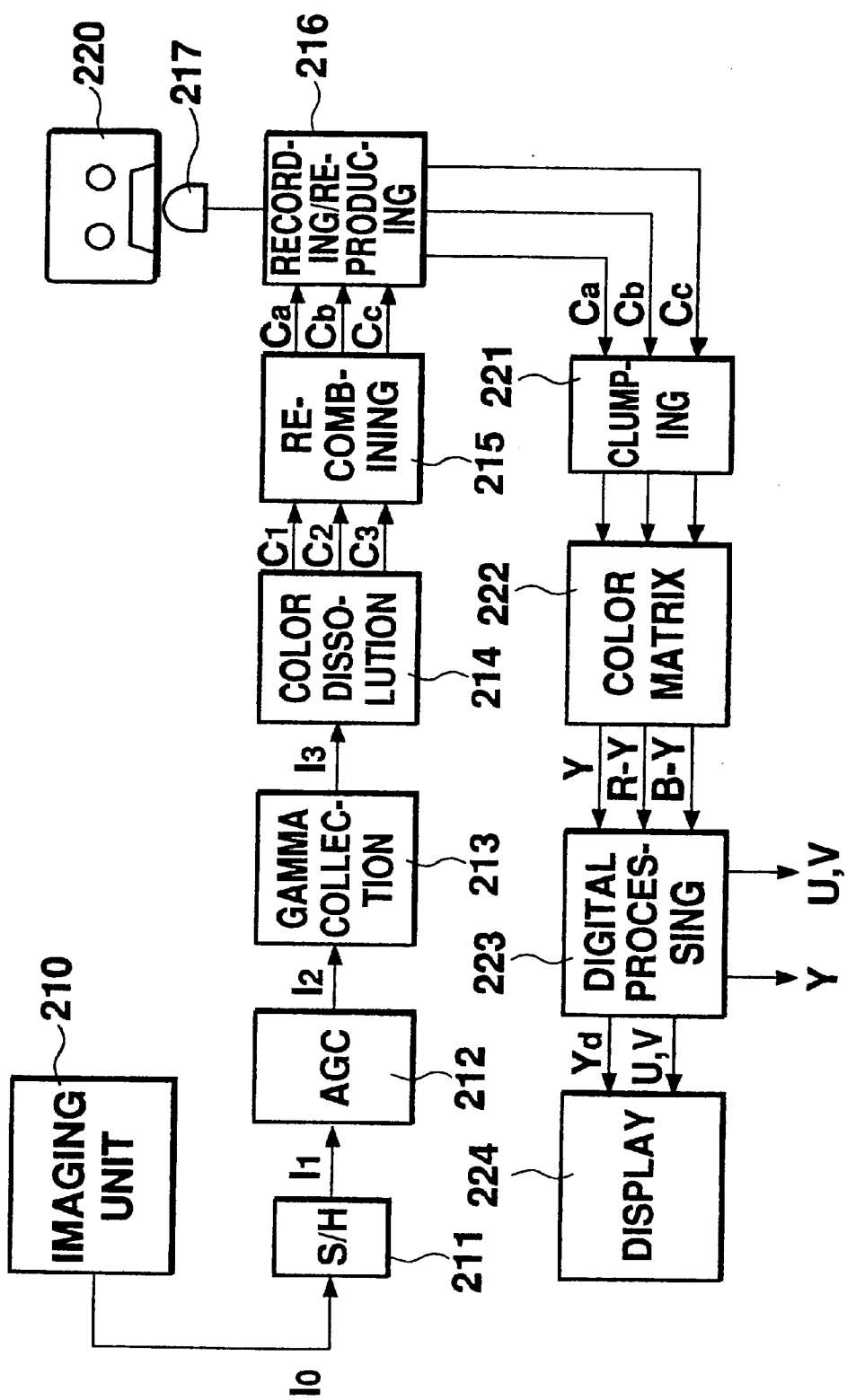
FIG. 12 is a block diagram representing a structure of an image signal recording and reproducing apparatus according to a third preferred embodiment of the present invention.

The recording/reproducing section 116 receives luminance modulated signals m1, m2, color difference modulated signal mc, and sound modulated signal mS from the modulator 115, and a composite signal S1 from the clock combiner 118, and writes them onto four recording tracks of a magnetic tape 120 through a magnetic head 117. For example, as shown in FIG. 12, luminance modulated signals m1, m2 are recorded in the first and second recording tracks for every block (64 pixels), while color difference modulated signal mc is recorded in the third recording track. Note that, in this recording, a color difference modulated signal mc corresponding to the first color difference data U, namely signal mc-U, and that corresponding to the second color difference data V, namely a signal Mc-V, are recorded alternately for every block. Finally, a composite audio signal S1 including a reference clock CK is continuously recorded in the fourth recording track.

While recording modulated signals m1, m2, mc, and a composite audio signal S1, the recording/reproducing section 16 also reads recorded modulated signals m1, m2, mc, a composite audio signals S1, as the section 116 is constructed so as to read those signals recorded in the magnetic tape 130 using the magnetic head 117, and supply them to a demodulator 121 and a clock separator 125 in the image reproduction mode. That is, the section 16 performs either a writing or reading operation using modulated signals m1, m2, mc, and a composite audio signals S1 with respect to the magnetic tape 130 according to an operation mode desirably switched.

Demodulator 121 gives a decoding operation with respect to the reproduced signals supplied via three separate lines from the section 116 to thereby restore digital data of compressed luminance data y1, y2 and compressed color difference data c. In other words, the demodulator 121 demodulates modulates signals m1, m2, mc, based on a reference clock CK supplied from the clock separator 125. As a result, inverse processing to the modulating processing by the modulator 115 is properly achieved regardless of fluctuation in the traveling speed of the magnetic tape 130.

The operations of a JPEG decoder 122 and a second digital processor 123 are the same as described in the first preferred embodiment and will not be described again here.

Figure 10B:
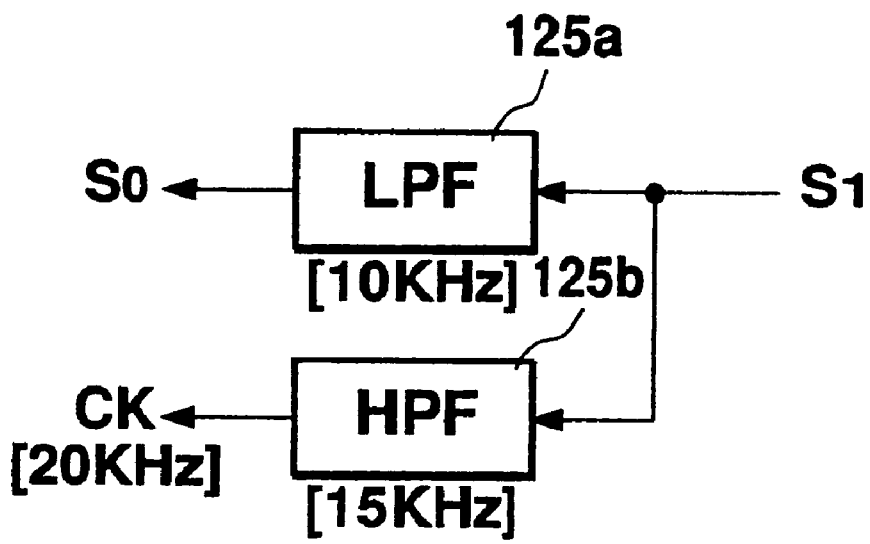
FIG. 10B is a block diagram representing structures of clock separator.
Figure 11:
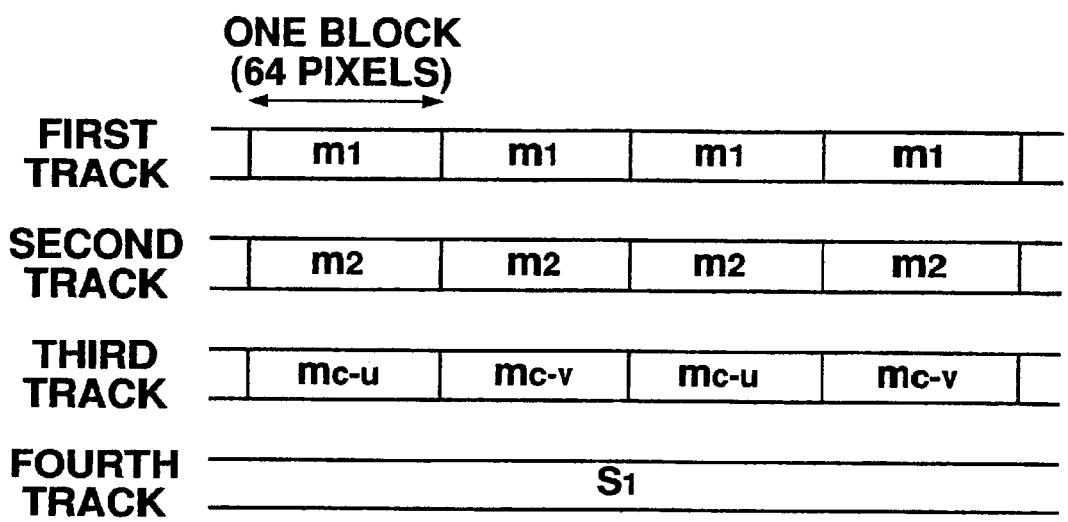
FIG. 11 is a diagram illustrating recording status of recording tracks of a magnetic tape.

A clock separator 125 comprises a low pass filter 125a and a high pass filter 125b, as shown in FIG. 10B. The separator 125 extracts from a composite audio signal S1 supplied by the recording/reproducing section 116, an audio signal S0 through the low pass filter 125a, and a reference clock CK through the high pass filter 125b. The cut-off frequency of the low pass filter 125a is set equal to that of the clock combiner 118a of the clock combiner 118, while that of the high pass filter 125b is set higher than that of the low pass filter 118a of the clock combiner 118 and lower than the frequency of the reference clock CK. For instance, providing that the cut-off frequency of the low pass filter 118a is set at 10 KHz and the frequency of a reference clock CK is 20 KHz, the cut-off frequency of the low pass filter 125a is set at 10 KHz and that of the high pass filter 125b is 15 KHz.

A sound reproducer 126 comprises an amplifier and a speaker, and reproduces sounds via the speaker in response to an audio signal S0 (excluding 10 KHz or more frequency components) which has been deprived of a reference clock by the clock separator 125. With this operation, sounds can be reproduced accompanying image displaying by the display device 124.

Data transmission rates at respective sections under QCIF Standards were described in the first preferred embodiment and will not be repeated here.

Also as described in the first embodiment, the respective modulated signals m1, m2, mc to be supplied to the recording/reproducing 116 each have a frequency of 43.24K/2=21.12 KHz.

An audio cassette tape, which is generally usable with a frequency band up to around 20 KHz, is nevertheless able to record these signals, even if the frame rate of the image taking unit 10 is equal to the compression rate of the JPEG encoder 14, as described in the first embodiment.

In the above, an image signal according to the QCIF standard has been described. The applicable standard is, however, not limited to QCIF, and any standard defining a size up to that of CIF may be used in recording image signals in magnetic recording media, such as a conventional audio cassette tape. Also, data compression algorithm other than JPEG, such as MPEG or H.263, may be used instead.

As described above, according to this embodiment of the present invention, it is possible to record and reproduce an image signal for color images on a simple structure using an audio cassette tape. Thus, there can be provided a low cost imaging device capable of recording and reproducing an image signal for displaying a small picture on a computer device.

Embodiment 3

FIG. 12 is a block diagram representing a structure of an image signal recording and reproducing apparatus of a third preferred embodiment of the present invention.

Figures 13, 14:
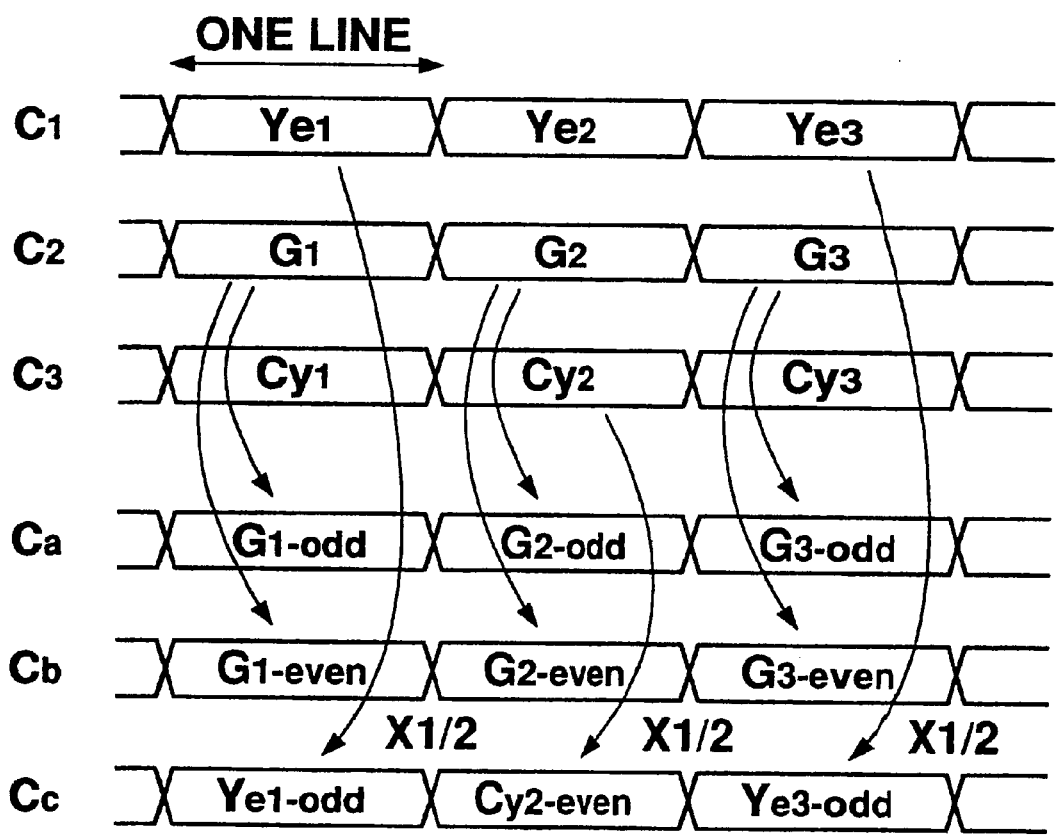
FIG. 13 is a plan view showing an example structure of a mosaic color filter.
FIG. 14 is a diagram explaining an operation timing of a recombiner.
Figure 15:
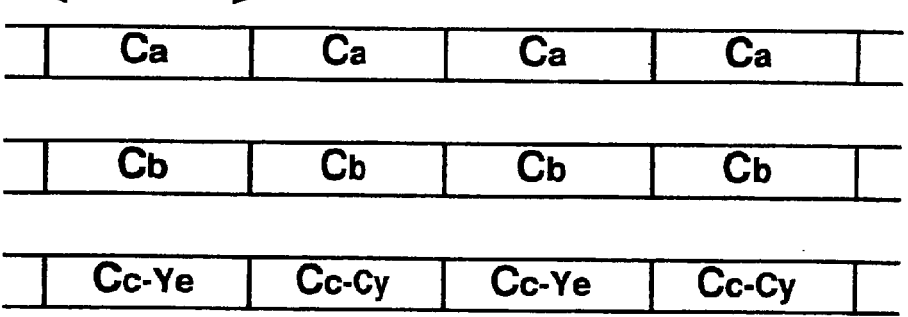
FIG. 15 is a diagram illustrating recording status of a recording track of a magnetic tape.

An imaging unit 210 has the structure of that of a conventional image taking unit as shown in FIG. 19, comprising a timing controller, a driver, and an image sensor. An image sensor complying to, for example, the QCIF standard, has 176×120 (horizontal×vertical) pixels attached thereto, and outputs an image signal I0 for an image picture consisting of 120 horizontal lines, each including 176 pixels. The image sensor of the image taking unit 210 carries a color filter. This color filter may, for example, be stripe, as shown in FIG. 13, in which lines of yellow (Ye), green (G), and cyan (Cy) segments are repeatedly arranged. Therefore, an image signal passing through the filter contains color components corresponding to each segment of the color filter. A sample/hold circuit 211 samples an image signal I0 supplied from an image taking unit 210, at a timing according to an output operation of the unit 210, and outputs an image signal I1. That is, an image signal I0 wherein voltage repeatedly rises/falls to a reset level and a signal level in synchronism with the output operation of the image sensor of the image taking unit 210, is processed by the sample/hold circuit 211 such that voltages at a signal level are extracted, thereby obtaining an image signal I1 wherein voltage remains at a signal level.

An automatic gain controller 212 amplifies the image signal I1 supplied from the sample/hold circuit 211 such that the average (signal voltage ?) level during a certain period of time remains within a predetermined range, and outputs an image signal I2.

A gamma corrector 213 performs non-linear conversion with respect to the image signal I2 supplied from the automatic gain controller 212, and outputs an image signal I3. Non-linear conversion is made to correct a linear distortion perceived by human sight in order to generate an image signal I3 with a linear distortion corrected.

A color dissolver 214, which operates in synchronism with an output operation of the image taking unit 210, dissolves the image signal I3 into respective color components. For instance, when using a striped color filter as shown in FIG. 14, an image signal I3 is dissolved (in a predetermined manner) during three cycles, thereby generating color component signals C1, C2, C3 respectively corresponding to color components Ye, G, Cy. The color dissolver 114 maintains a constant voltage during the cycles for dissolution (for instance, a three-clock period). With this dissolution, each frequency of the color components signals C1, C2, C3 is reduced to one third of that of the image signal I3.

A recombiner 215 combines color component signals C1, C2, C3 supplied from the color dissolver 214 to thereby generate two types of separated color component signals Ca and Cb and a compound color component signal Cc. Signals Ca and Cb are formed by halving a color component signal C2 corresponding to a color component G; a signal Cc is formed by compounding color component signals C1 and C3 respectively corresponding to color components Ye and Cy.

Specifically, in the circuit 215, color component signals C2, which correspond to color components G which are influential in a luminance signal, are extracted from all lines without being compressed, and separated into odd-numbered segments and even-numbered segments to respectively constitute color component signals Ca and Cb. Moreover, color components signals C1, C3, respectively correspond to color components Ye and Cy, which are less influential in a luminance signal as compared to color components G, are extracted for every other line, and alternately connected together to constitute a compound color component signal Cc. For instance, when using a staiped color filter as shown in FIG. 13, color component signals C1, C2, C3 are supplied in lines to the re-combiner 215. Then, signal C2 is divided into two groups, one for the odd-numbered segments (Gn-odd) and the other for even-numbered segments (Gn-even) which respectively constitute two types of separated color components signals Ca, Cb. Further, color component signals C1 and C3 are extracted from the respective odd-numbered and even-numbered lines, and alternately connected together as respective odd-numbered (Yen-odd) and an even-numbered (Cyn-even) color components. The connected color components constitute a compound color component signal Cc. With this operation, each frequency of the separated color component signals Ca, Cb and a compound color component signal Cc has been lowered to a half of that of the color component signals C1, C2, C3.

The recording/reproducing section 216 receives separated color component signals Ca, Cb and a compound color component signal Cc from the re-combiner 215, and writes them onto a magnetic tape 220 through magnetic head 217. The magnetic tape 220 has three or more recording tracks so as to record, for instance, independently the first and second separated color components signals Ca, Cb and a compound color component signal Cc in lines. Note that, in the third recording track, yellow color components (Cc-Ye) and cyan color components (Cc-Cy) are alternately recorded, corresponding to the compound color component signal C.

While recording these separated color component signals Ca, Cb and a compound color component signal Cc, the recording/reproducing section 216 also reads recorded separated color component signals Ca, Cb and a compound color component signal Cc, as the section 216 is constructed so as to read these signals Ca, Cb, Cc recorded in the magnetic tape 220 through magnetic head 217, and supply them to a clumping circuit 221 in the image reproduction mode. That is, the section 216 performs either a writing or reading operation using separated color component signals Ca, Cb, and a compound color component signal Cc with respect to the magnetic tape 220 according to an operation mode desirably switched.

A clumping circuit 221 performs a clumping operation at a reference level with respect to every line of separated color component signals Ca, Cb and a compound color component signal Cc supplied from the sector 16. That is, a voltage of the signals Ca, Cb, Cc is fixed at a predetermined value during a period provided either at the beginning or end of each line of the signals, whereby the voltage levels of the signals Ca, Cb, Cc are stabilized, the voltage level during the period being regarded as a reference level.

A color matrix circuit 222 performs a matrix operation with respect to the separated color component signals Ca, Cb and a compound color component signal Cc supplied from the clumping circuit 221 to thereby generate a luminance signal Y and color difference signals R-Y, B-Y. That is, all color components contained in the separated color component signals Ca, Cb, and the compound color component signal Cc are summed up whereby a luminance signal Y is generated which contains the three primary color components, i.e., red (R), green (G), and blue (b) combined at the ratio 1:3:1. Also, color component R is generated by subtracting color components G from color components Ye; color components B is generated by subtracting color components G from color components Cy. Still further, color difference signals (R-Y) and (B-Y) are generated through subtraction of a luminance signal respectively from color components R and B. Note that, as to a compound color component signal Cc, a conventional delay line is employed so that lines for color components Ye and Cy can appear simultaneously at every line, as each line otherwise represents only one of a color component Ye or Cy.

A digital processor 223 gives digital conversion to a luminance signal Y and color difference signals R-Y, B-Y supplied from the color matrix circuit 222, as well as a filtering operation for outline correction and other operations for color balance adjustment. With these operations, luminance data Y0 and color difference data U, V are generated. Note that the luminance signal Y and color difference signals R-Y, B-Y may also be supplied to an external device. The digital processor 223 supplies resultant luminance data Y0 and color difference data U, V to a computer device in a predetermined format, as well as to a display device 224. With the above, an image read from the magnetic tape 220 can be displayed on a monitor.

Here, frequencies of respective signals according to QCIF Standards will be discussed.

An image picture according to QCIF Standards must consist of 176×120 (horizontal×vertical) pixels. Given a frame rate of $\frac{1}{15}$ seconds, an image signal I0 has a frequency of $$176 \times 120 \times 15 = 316.8 \text{ KHz},$$

which is common to image signals I0 to I3. At the color dissolver 14, where an image signal I3 is dissolved into three components, namely color component signals C1, C2, C3, those divided signals each have a frequency of $$316.8/3 = 105.6 \text{ KHz}.$$

Further, at a re-combiner 215, where a color component signal C2 is halved into separated color component signals Ca, Cb, and color component signals C1, C2 are curtailed to be one second, the resultant signals, namely, signals, Ca, Cb, Cc, each have a frequency of $$105.6/2 = 52.8 \text{ KHz}.$$

A common audio cassette tape, which is generally usable with a frequency band up to around 20 KHz, is able to record separated color component signals Ca, Cb and a compound color component signal Cc having the above calculated frequency when the tape is driven at three times its normal speed.

In the above, an image signal according to QCIF Standards have been described. It is, however, not limited to QCIF, and any standard defining a size up to that of CIF may be applicable in recording image signals in magnetic recording media, such as an audio cassette tape. Also, data compression algorithm other than JPEG, such as MPEG or H.263, may be used instead.

As described above, according to this embodiment of the present invention, it is possible to record and reproduce an image signal for color images on a simple structure using an audio cassette tape. Thus, there can be provided an imaging device, with a small cost, for recording and reproducing an image signal for displaying a picture small enough to be taken into a computer device.

Embodiment 4

Figure 16:
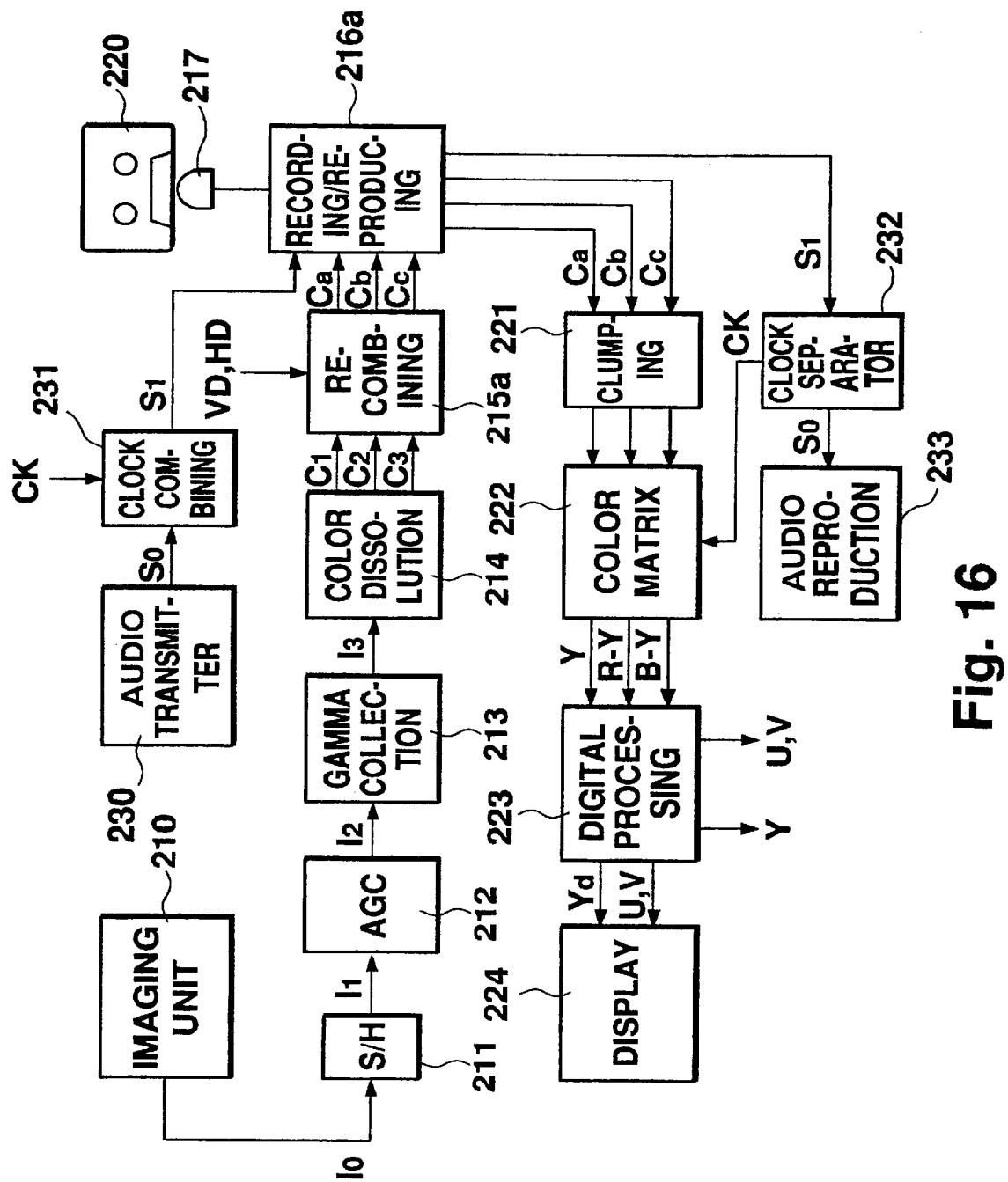
FIG. 16 is a block diagram representing a structure of an image signal recording and reproducing apparatus according to a fourth preferred embodiment of the present invention.

FIG. 16 is a block diagram representing a structure of a fourth preferred embodiment of the present invention.

The structure from sample/hold circuit 211 to the color dissolver 214, and that from the clumping circuit 221 to the display device 224 are identical to those shown in FIG. 13 for the third preferred embodiment. In this embodiment, a sound transmitter 230 for outputting an audio signal is connected so that an audio signal is recorded in a magnetic tape 220 together with separated color component signals Ca, Cb and a compound color component signal Cc.

A sound transmitter 230, including a microphone and an amplifier, gathers sound when recording object images, and outputs the sound as an audio signal S0. The sound transmitter 230 is generally provided together with the imaging unit 210.

Figure 17A:
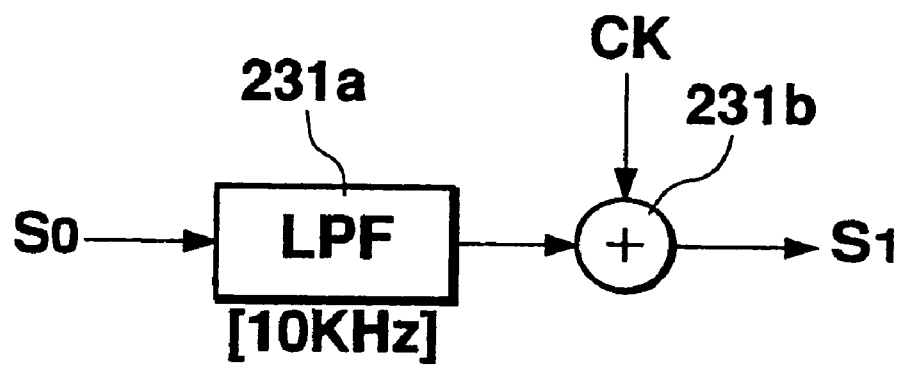
FIG. 17A is a diagram representing structures of a clock combiner.

A clock combiner 231 comprises a low pass filter 231*a* and an adder 231*b,* as shown in FIG. 17A. The combiner 231 obtains, through the low pass filter 231*a,* the audio signal S0 input from the sound transmitter 230, and superimposes by using the adder 231*b* a common reference clock CK onto the audio signal S0, to thereby generate a composite audio signal S1 to output. A reference clock CK is in synchronism with an output operation of a re-combiner 215, and also with separated color difference component signals Ca, Cb and a compound color component signal Cc.

When the low pass filter (218*a* ?) is set to have a 10 KHz cut-off frequency, listeners can hear the sounds reproduced from signals having passed through the filter without difficulty because most human ears can not hear frequency components greater than 10 KHz. While the cut-off frequency for the low pass filter is thus set at 10 KHz, a reference clock CK has a frequency of about 52.8 KHz, similar to separated color component signals Ca, Cb and a compound color component signal Cc. Therefore, frequency bands of an audio signal S0 and a reference clock CK can be separated.

Similar to the structure shown in FIG. 12, a recombiner 215*a* combines color component signals C1, C2, C3 to thereby generate two types of separated color component signals Ca and Cb, and a compound color component signal Cc. In this process, a vertical synchronizing signal VD and a horizontal synchronizing signal HD are superimposed onto any of the separated color component signals Ca, Cb, or a compound color component signal Cc during the blanking periods. For instance, a vertical synchronizing signal VD for determining a vertical scanning timing with an image signal I0, is superimposed onto a separated color component signal Ca during the blanking period thereof, while a horizontal synchronizing signal HD for determining a horizontal scanning timing is superimposed onto a separated color component signal Cb during the blanking period thereof. That is, with superimposition of vertical and horizontal synchronizing signals VD and HD onto two types of independent separated color component signals Ca, Cb, separation of vertical and horizontal scanning signals is unnecessary.

Figure 18:
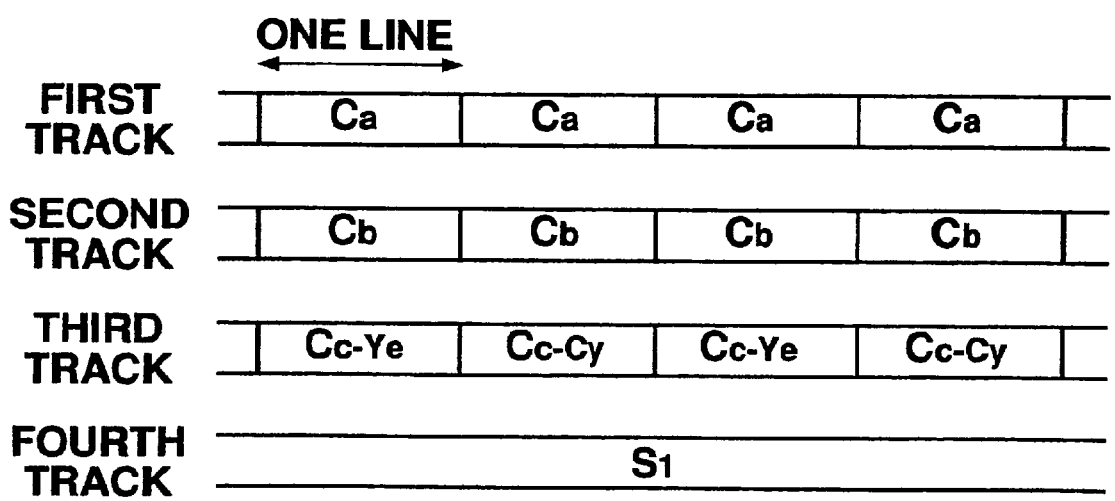
FIG. 18 is a diagram illustrating recording status of a recording track of a magnetic tape.

The recording/reproducing section 216*a* receives composite audio signal S1 from the clock combiner 231, and separated color component signals Ca, Cb, and a compound color component signal Cc from the re-combiner 215*a,* and writes them in parallel onto the four recording tracks of a magnetic tape through magnetic head 217. For example, as shown in FIG. 18, the separated color components signals Ca, Cb are recorded in the first and second recording tracks, respectively; a compound color component signal Cc is recorded in the third recording track; and a composite audio signal S1 is continuously recorded in the fourth recording track.

While recording these separated color component signals Ca, Cb, a compound color component signal Cc, and a composite audio signal S1, the recording/reproducing section 216*a* also reads recorded separated color component signals Ca, Cb, a compound color component signal Cc, and a composite audio signal S1. The read separated color component signals Ca, Cb and a compound color component signal Cc are supplied to the clumping circuit 221, while the composite audio signal S1 is supplied to the clock separator 232.

Figure 17B:
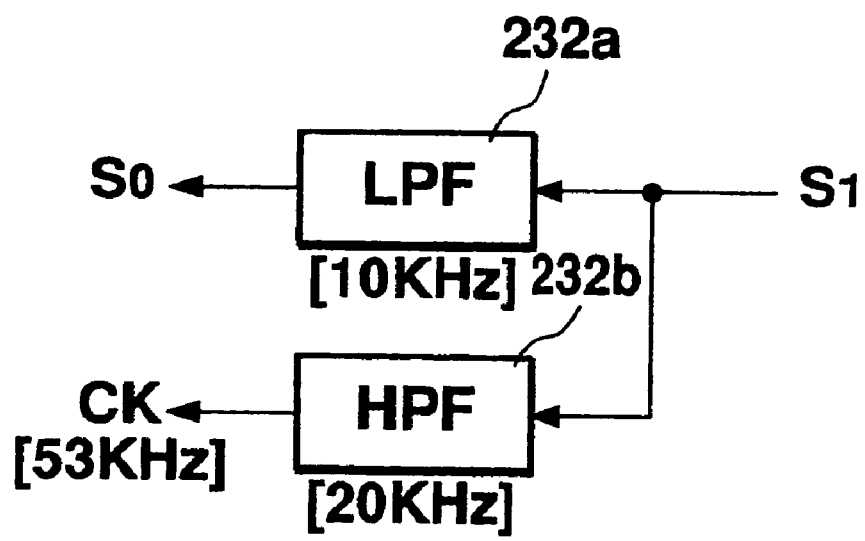
FIG. 17B is a diagram representing structures of a clock separator.

A clock separator 232 comprises a low pass filter 125*a* and a high pass filter 125*b,* as shown in FIG. 17B. The separator 25 extracts from a composite audio signal S1 supplied by the recording/reproducing section 216*a,* an audio signal S0 through the low pass filter 232*a,* and a reference clock CK through the high pass filter 232*b.* The cut-off frequency of the low pass filter 232*a* is set equal to that of the clock combiner 231*a,* while that of the high pass filter 232*b* is set higher than that of the low pass filter 232*a* and lower than the frequency of the reference clock CK. For instance, providing that the cut-off frequency of the low pass filter 231*a* is set at 10 KHz and the frequency of a reference clock CK is 53 KHz, the cut-off frequency of the low pass filter 232*a* is set at 10 KHz and that of the high pass filter 232*a* is at 20 KHz. The reference clock CK extracted by the clock separator 232, is supplied to the color matrix circuit 222 to be referred to in a matrix operation.

The color matrix circuit 222 is able to perform a matrix operation based on a vertical synchronizing signal VD and a horizontal synchronizing signal HD superimposed onto any of the separated color component signals Ca, Cb, and a compound color component signal Cc during the blanking periods. Thus, erroneous operation due to unmatched timing can be prevented.

The sound reproducer 233 comprises an amplifier and a speaker, and reproduces sounds via the speaker in response to a audio signal S0 (excluding 10 KHz or more frequency components) which has been deprived of a reference clock by the clock separator 125. With this operation, sound reproduction is achieved accompanying image displaying by the display device 224.

In the fourth preferred embodiment, a composite audio signal S1 including a reference clock CK is recorded on a recording media, or a magnetic tape 220, together with separated color component signals Ca, Cb and a compound color component signal Cc. With this arrangement, reproduction (?) timings for separated color component signals Ca, Cb and a compound color component signal Cc can be easily synchronized at the time of image reproduction.

In the above, an image signal according to the QCIF standard have been described, however, any standards defining a size up to that of the CIF standard may be used to record image signals in magnetic recording media, such as an audio cassette tape. As described in the above, according to the present invention, it is possible to record and reproduce an image signal for color images on a simple structure using an audio cassette tape. Thus, there can be provided a low cost imaging device, for recording and reproducing an image signal for displaying a small picture suitable for computer devices.

Further, since a reference clock is superimposed on an audio signal so as to be recorded together with an image signal, it is possible to make image and audio signals to be synchronized at the time of image reproduction, so that an image signal can be accurately reproduced, even if the traveling speed of a reproduction mechanism is rather unstable.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. An image signal recording and reproducing apparatus for recording an image signal in a recording medium having a plurality of recording tracks, the image signal corresponding to successive images screen by screen, comprising:

a supplier for continuously supplying image data corresponding to the image signal, the image data individually representing a plurality of pixels each responsible for a specific color component;

a processor for generating luminance data for each pixel, based on the image data,
outputting in parallel a pair of separated luminance data obtained by halving the luminance data generated,
generating two types of color difference data each corresponding to four pixels, based on the image data, and
outputting a compound color difference data obtained by alternately combining the two types of color difference data generated, by a predetermined unit;

a compressing encoder for generating a pair of compressed luminance data and a compressed color difference data by giving a compressing operation to the pair of separated luminance data and the compound color difference data according to a predetermined algorithm;

a modulator for generating a pair of luminance modulated signals and a color difference modulated signal by giving an analog modulating operation to the pair of compressed luminance data and the compressed color difference data; and a recorder for writing the pair of luminance modulated signals and the color difference modulated signal onto first to third parallel recording tracks of the recording medium.

2. An image signal recording and reproducing apparatus according to claim 1, wherein:
the recorder writes an audio signal corresponding to the image signal onto a fourth recording track of the recording medium.

3. An image signal recording and reproducing apparatus according to claim 1, further comprising:
a reproducer for reading a pair of luminance modulated signals and a color difference modulated signal respectively from the first to third recording tracks of the recording medium;
a demodulator for generating a pair of compressed luminance data and compressed color difference data by giving a demodulating operation to the pair of luminance modulated signals and the color difference modulated signal; and
an expanding decoder for restoring a pair of separated luminance data and compound color difference data by giving an expanding operation according to an identical algorithm employed by the compressing encoder, to the pair of compressed luminance data and the compressed color difference data.

4. An image signal recording and reproducing apparatus according to claim 3, wherein:
the recorder writes an audio signal corresponding to the image signal onto the fourth recording track of the recording medium, and
the reproducer reads the audio signal from the fourth track of the recording medium.

5. An image signal recording and reproducing apparatus for recording an image signal in a recording medium having a plurality of recording tracks, the image signal corresponding to successive images screen by screen, comprising:

a supplier for continuously supplying image data corresponding to the image signal, the image data individually representing a plurality of pixels each responsible for a specific color component;

a sound supplier for continuously supplying an audio signal corresponding to the image signal;

a processor for generating luminance data for each pixel, based on the image data,
outputting in parallel a pair of separated luminance data obtained by halving the luminance data generated,
generating two types of color difference data each corresponding to four pixels, based on the image data, and
outputting a compound color difference data obtained by alternately combining the two types of color difference data generated, by a predetermined unit;

a compressing encoder for generating a pair of compressed luminance data and a compressed color difference data by giving a compressing operation to the pair of separated luminance data and the compound color difference data according to a predetermined algorithm; and a modulator for generating a pair of luminance modulated signals and a color difference modulated signal by giving an analog modulating operation to the pair of compressed luminance data and the compressed color difference data;

a clock combiner for generating a composite audio signal by superimposing a timing clock signal of a predetermined cycle onto the audio signal; and a recorder for writing the pair of luminance modulated signals, the color difference modulated signal, and the composite audio signal onto first to fourth parallel recording tracks of the recording medium.

6. An image signal recording and reproducing apparatus according to claim 5, wherein:
the clock combiner includes a low pass filter having a cut-off frequency higher than a highest frequency of the audio signal, and lower than a frequency of the timing clock signal, and
a composite audio signal is generated by superimposing a timing clock signal onto the audio signal having passed through the low pass filter.

7. An image signal recording and reproducing apparatus according to claim 5, further comprising:
a reproducer for reading a pair of luminance modulated signals a color difference modulated signal, and a composite audio signal respectively from the first to fourth recording tracks of the recording medium;
a clock separator for individually extracting the audio signal, and the timing clock signal from the composite audio signal;
a demodulator for generating a pair of compressed luminance data and compressed color difference data by giving a demodulating operation to the pair of luminance modulated signals and the color difference modulated signal according to the timing clock signal; and
an expanding decoder for restoring a pair of separated luminance data and compound color difference data by giving an expanding operation according to an identical algorithm employed by the compressing encoder, to the pair of compressed luminance data and the compressed color difference data.

8. An image signal recording and reproducing apparatus according to claim 7, wherein:

the clock combiner includes a low pass filter having a cut-off frequency higher than a highest frequency of the audio signal, and lower than a frequency of the timing clock signal, a composite audio signal being generated by superimposing a timing clock signal onto the audio signal having passed through the low pass filter, the clock separator includes a low pass filter having a cut-off frequency lower than a frequency of the timing clock signal and a high pass filter having a cut-off frequency higher than a highest frequency of the audio signal, the audio signal is extracted from the composite audio signal by having the composite audio signal to pass through the low pass filter; and the timing clock signal is extracted from the composite audio signal by having the composite audio signal to pass through the high pass filter.

9. An image signal recording and reproducing apparatus for recording an image signal in a recording medium having a plurality of recording tracks, the image signal corresponding to successive images screen by screen, comprising:

a supplier for continuously supplying image data indicating values of a plurality of pixels, the pixels being arranged in a matrix with respect to the image and cyclically corresponded to first to third different color components;

a signal processor for distributing the image signal into a first color component, a second color component, and a third color component;

generating first separated color component signal and a second separated color component signal by halving the first color component, and generating a compound color component signal by combing the first color component and the second color component; and a recorder for writing the first separated color component signal and the second separated color component signal onto a first and second recording tracks arranged in parallel on the recording medium, and the compound color component signal onto a third recording track on the recording medium.

10. An image signal recording and reproducing apparatus according to claim 9, further comprising:

a reproducer for reading the first separated color component signal, the second separated color component signal, and the compound color component signal from the recording medium; and a color encoder for generating a luminance signal, a first color difference signal, and a second color difference signal based on the first separated color component signal, the second separated color component signal, and the compound color component signal read from the recording medium.

11. An image signal recording and reproducing apparatus for recording an image signal in a recording medium having a plurality of recording tracks, the image signal corresponding to successive images screen by screen, comprising:

a first supplier for continuously supplying image data indicating values of a plurality of pixels, the pixels being arranged in a matrix with respect to the image and cyclically corresponded to a plurality of different color components;

a signal processor for generating a plurality of color component signals by dissolving the image signal into each color component;

a second supplier for generating an audio signal corresponding to the image;

a clock combiner for generating a composite audio signal by superimposing a clock signal onto the audio signal, the clock signal having a constant cycle in synchronism with the number of color component signals; and a recorder for writing the number of color component signals and the composite audio signal onto a plurality of recording tracks arranged in parallel in the recording medium.

12. An image signal recording and reproducing apparatus according to claim 11, further comprising:

a reproducer for reading the number of color component signals and the composite audio signal from the recording medium;

a color encoder for generating a luminance signal, a first color difference signal, and a second color difference signal, based on the number of color component signals and the composite audio signal read from the recording medium; and a clock separator for generating a timing signal by extracting the clock signal from the composite audio signal read from the recording medium.

* * * * *